United States Patent
Kikuchi

(10) Patent No.: US 9,350,719 B2
(45) Date of Patent: May 24, 2016

(54) DEVICE, INFORMATION PROCESSING TERMINAL, INFORMATION PROCESSING SYSTEM, DISPLAY CONTROL METHOD, AND RECORDING MEDIUM

(71) Applicant: Manami Kikuchi, Kanagawa (JP)

(72) Inventor: Manami Kikuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 14/273,911

(22) Filed: May 9, 2014

(65) Prior Publication Data
US 2014/0359701 A1 Dec. 4, 2014

(30) Foreign Application Priority Data
Jun. 4, 2013 (JP) .................................. 2013-117828

(51) Int. Cl.
| | | |
|---|---|---|
| *H04L 29/06* | (2006.01) | |
| *G06F 3/12* | (2006.01) | |
| *G06F 7/04* | (2006.01) | |

(52) U.S. Cl.
CPC .............. *H04L 63/08* (2013.01); *G06F 3/1203* (2013.01); *G06F 3/1225* (2013.01); *G06F 3/1238* (2013.01); *G06F 3/1285* (2013.01)

(58) Field of Classification Search
CPC ... G06F 3/1238; G06F 3/1225; G06F 3/1203; G06F 3/1285; H04L 63/08
See application file for complete search history.

(56) References Cited

U.S. PATENT DOCUMENTS

| | | | | |
|---|---|---|---|---|
| 8,065,629 B1 * | 11/2011 | Ragan | ................... | G06F 3/0481 |
| | | | | 715/760 |
| 2005/0231760 A1 * | 10/2005 | Minato | ................... | G06F 21/31 |
| | | | | 358/1.15 |
| 2006/0245621 A1 * | 11/2006 | Uno | ......................... | G06F 21/34 |
| | | | | 382/115 |
| 2007/0011624 A1 * | 1/2007 | Olsen | ..................... | G06Q 10/10 |
| | | | | 715/811 |

(Continued)

FOREIGN PATENT DOCUMENTS

| | | |
|---|---|---|
| JP | 2006-071684 | 3/2006 |
| JP | 2009-223577 | 10/2009 |
| JP | 2011-070348 | 4/2011 |

OTHER PUBLICATIONS

The Extended European Search Report issued Aug. 11, 2014, in Application No. / Patent No. 14170589.7-1959.

*Primary Examiner* — Darren B Schwartz
(74) *Attorney, Agent, or Firm* — Oblon, McClelland, Maier & Neustadt, L.L.P.

(57) ABSTRACT

A device includes an operation unit; a first processing unit sending a display request; a detection unit detecting a change of an authentication state of a user; a first communication unit receiving the display request, designating identification information identifying the configuration element, and transmitting the display request or transmitting notification information indicating the change of the authentication state to the operation unit. Further, the operation unit includes a second communication unit receiving the display request or the notification information, and a second processing unit displaying the configuration element in a form that is different from a form designated in the display request received by the first communication unit, or changing a display manner of the configuration element in accordance with the notification information.

14 Claims, 18 Drawing Sheets

(56) References Cited

U.S. PATENT DOCUMENTS

| | | | |
|---|---|---|---|
| 2007/0143861 A1* | 6/2007 | Ohishi | G06F 21/608 726/28 |
| 2009/0168103 A1* | 7/2009 | Yamada | G06F 3/1297 358/1.15 |
| 2009/0284790 A1 | 11/2009 | Ohashi | |
| 2011/0149332 A1* | 6/2011 | Cho | G06F 21/608 358/1.14 |
| 2012/0144329 A1 | 6/2012 | Sasaki | |
| 2012/0262480 A1* | 10/2012 | Christensen | G06F 3/04817 345/619 |
| 2012/0274971 A1* | 11/2012 | Tanabe | G06F 3/1222 358/1.14 |
| 2013/0014240 A1* | 1/2013 | Osuki | G06F 21/34 726/7 |
| 2013/0027736 A1* | 1/2013 | Kittaka | G06F 3/04817 358/1.14 |
| 2014/0009784 A1* | 1/2014 | Nara | G06F 3/0412 358/1.15 |

* cited by examiner

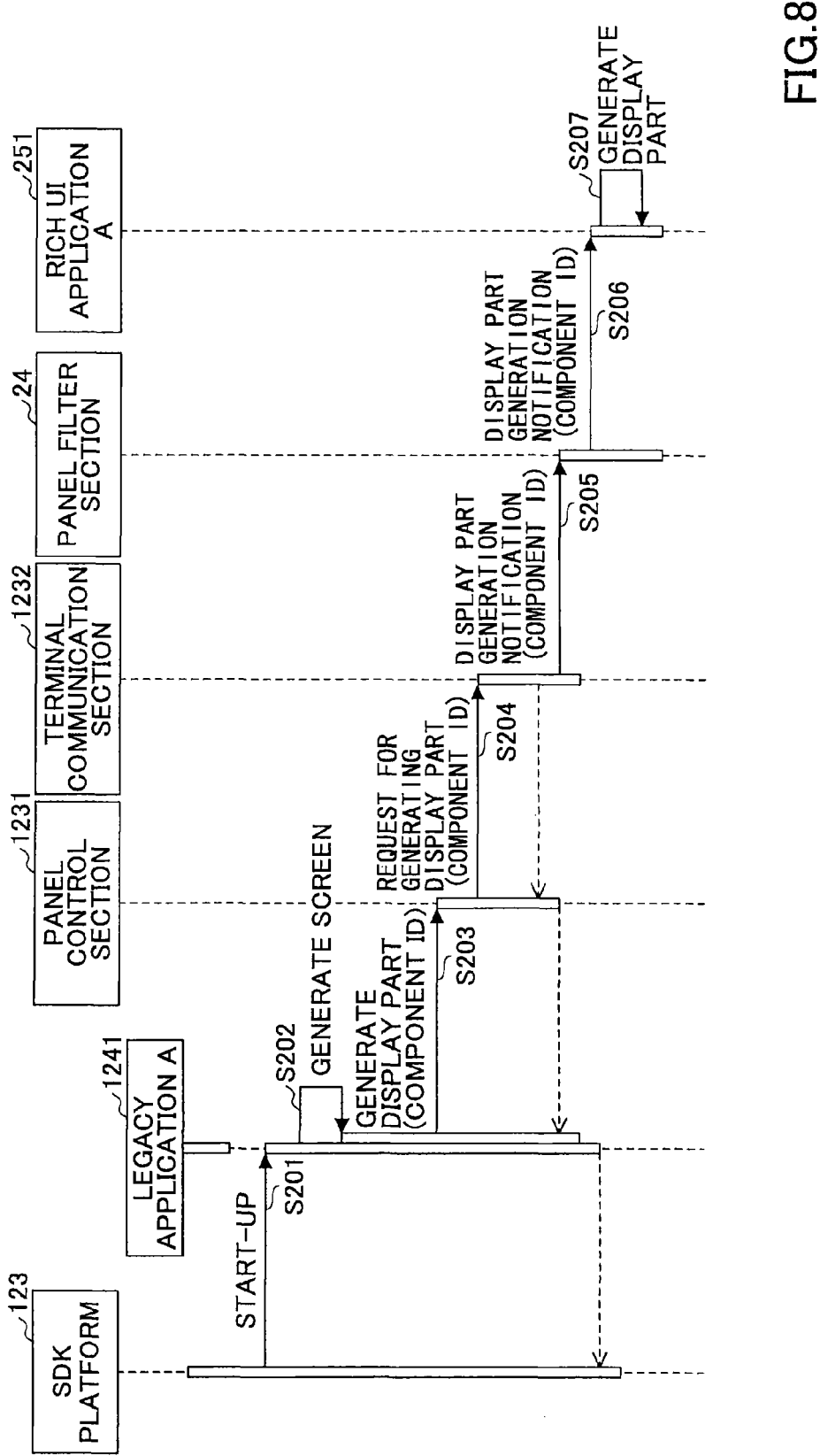

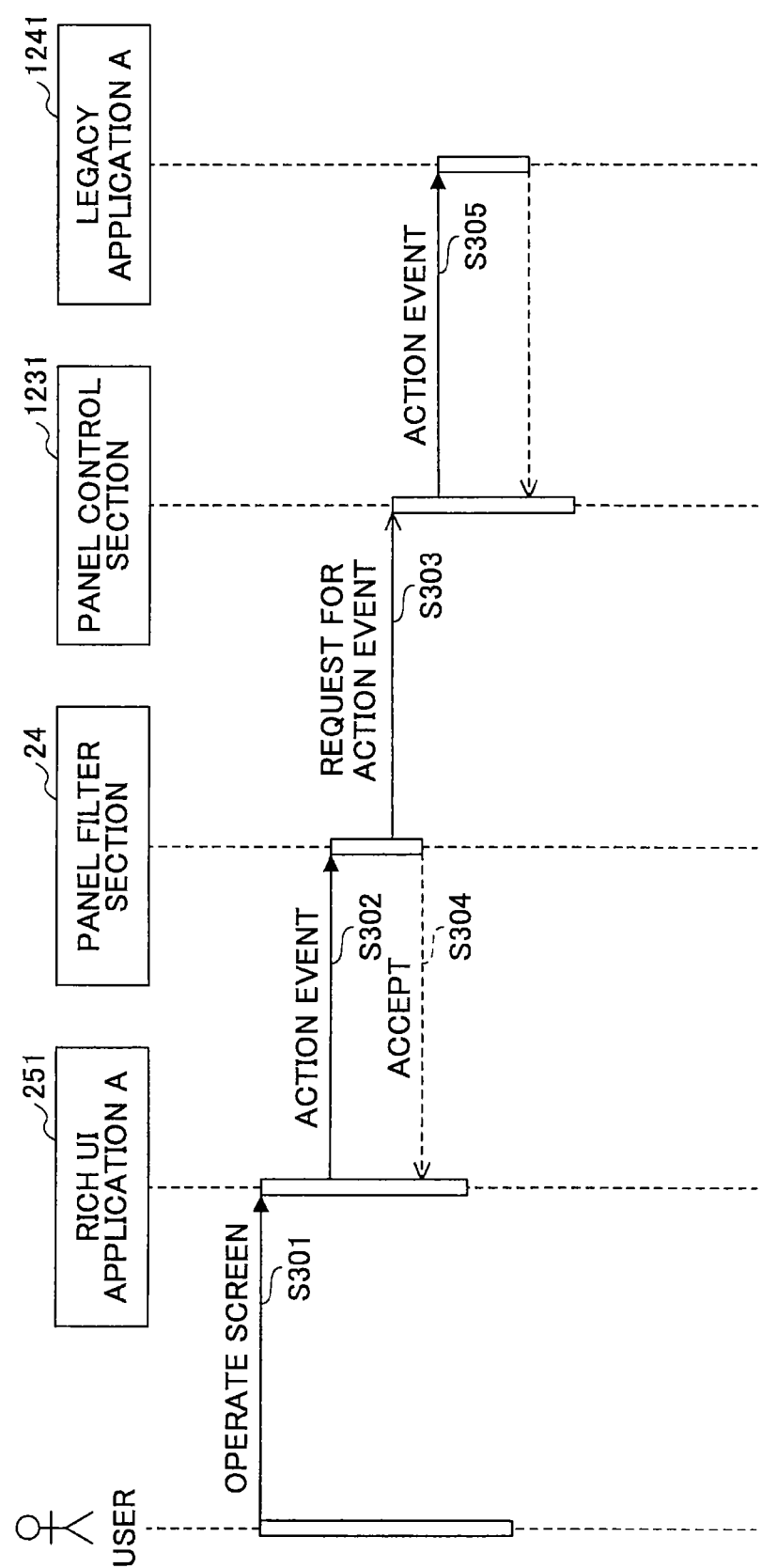

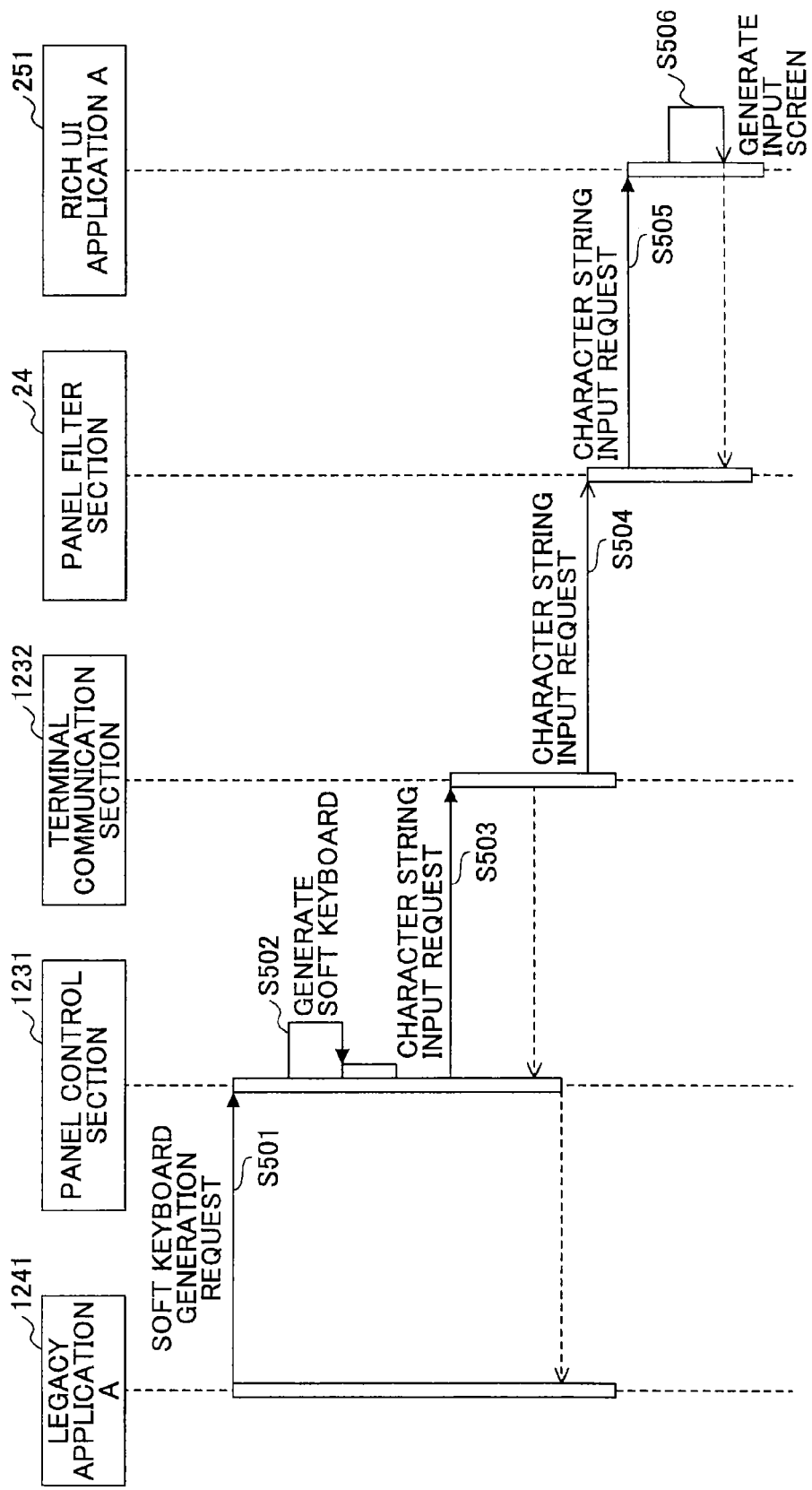

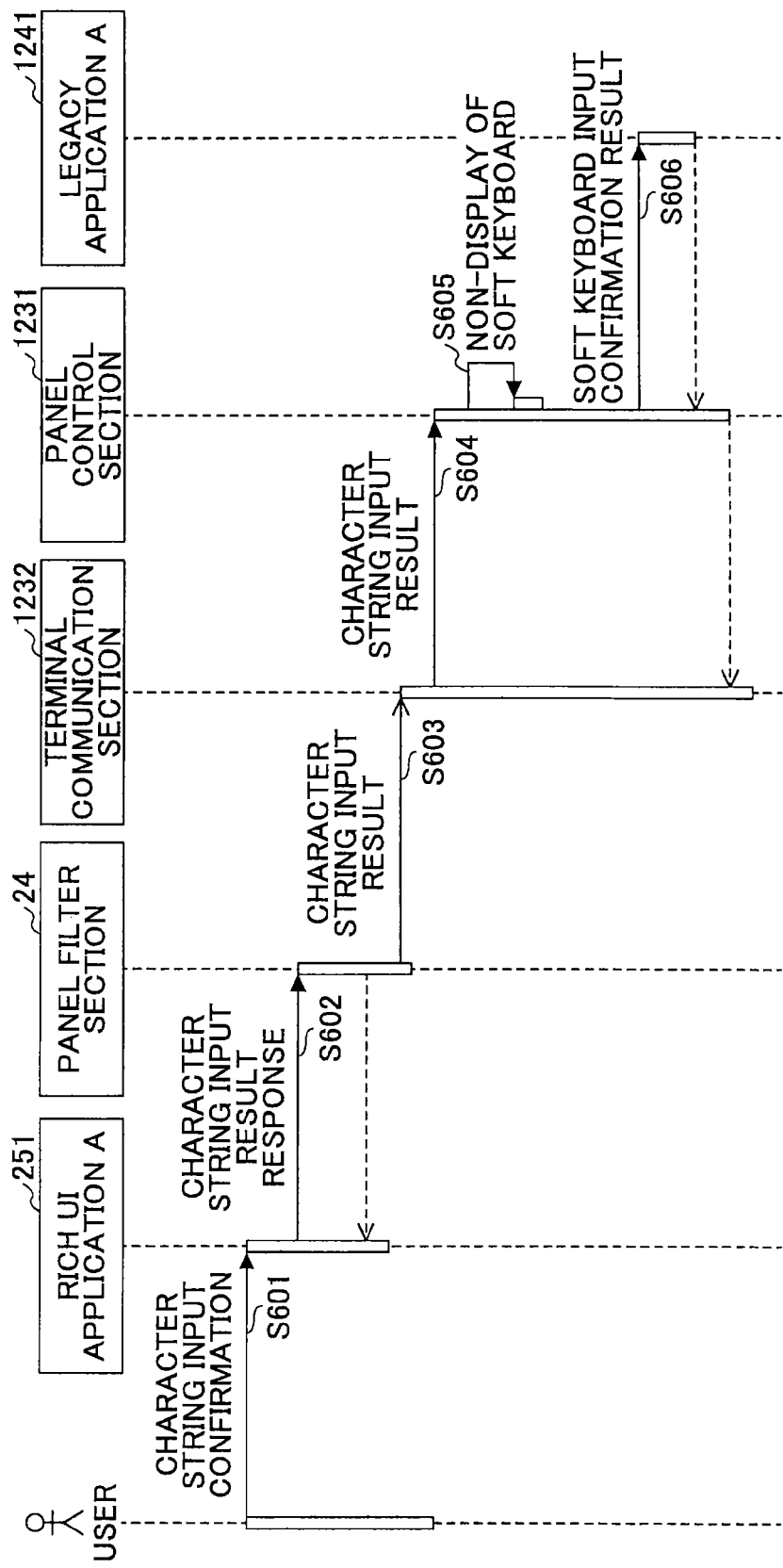

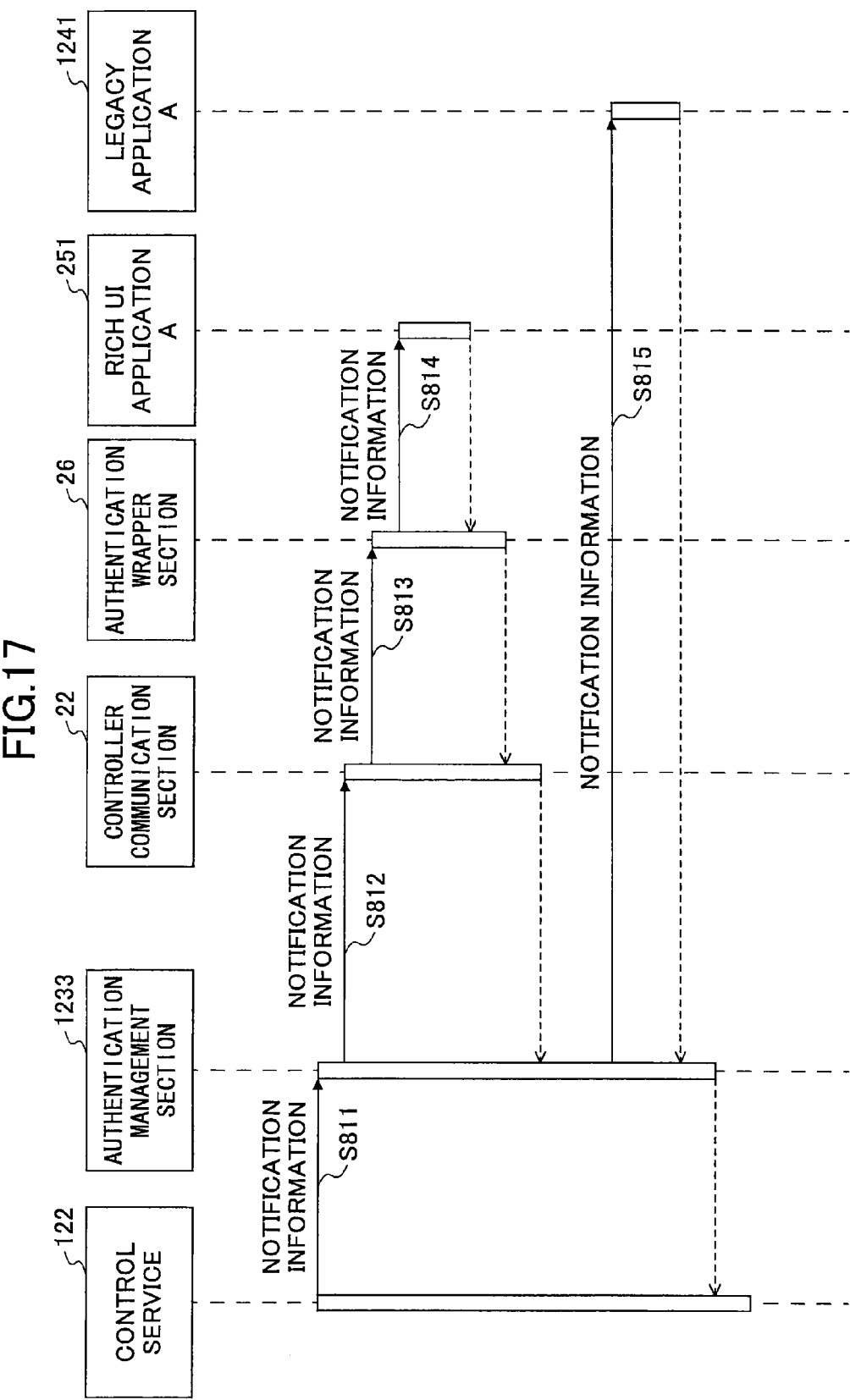

FIG.18

| TYPE OF NOTIFICATION INFORMATION | NOTIFICATION INFORMATION ITEMS | EXAMPLE |
|---|---|---|
| LOGIN NOTIFICATION | PRODUCT ID | 11111 |
| | USER NAME | ****, TARO |
| | USER ID | 1234567890 |
| | LOGIN RESULT | SUCCESSFUL |
| | TYPE OF AUTHENTICATION | MANAGER AUTHENTICATION |
| | TYPE OF BILLING APPARATUS WHICH IS BEING SET | KEY CARD |
| LOGOUT NOTIFICATION | PRODUCT ID | 11111 |
| | TYPE OF AUTHENTICATION | PERSONAL AUTHENTICATION |
| | TYPE OF BILLING APPARATUS WHICH IS BEING SET | COIN RACK |
| | LOGOUT RESULT | SUCCESSFUL |
| AUTHENTICATION SETTING CHANGE NOTIFICATION | TARGET ITEM | BILLING |
| | TYPE OF BILLING APPARATUS WHICH IS BEING SET | KEY COUNTER |
| AUTHENTICATION SETTING RELEASE NOTIFICATION | TARGET ITEM | APPLICATION BASED AUTHENTICATION |

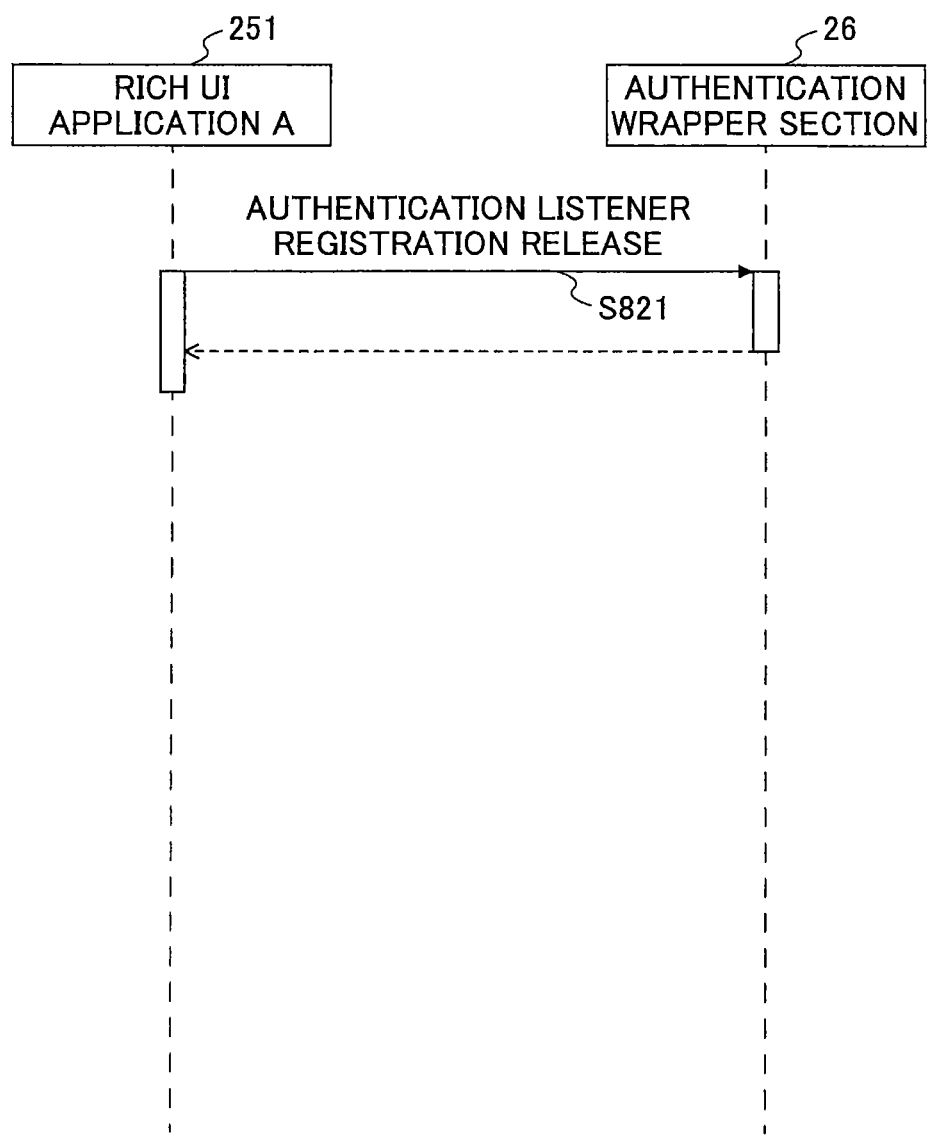

DEVICE, INFORMATION PROCESSING TERMINAL, INFORMATION PROCESSING SYSTEM, DISPLAY CONTROL METHOD, AND RECORDING MEDIUM

CROSS-REFERENCE TO RELATED APPLICATIONS

The present application is based on and claims the benefit of priority under 35 U.S.C §119 of Japanese Patent Application No. 2013-117828 filed Jun. 4, 2013, the entire contents of which are hereby incorporated herein by reference.

BACKGROUND OF THE INVENTION

1. Field of the Invention

The present invention generally relates to a device (an apparatus), an information processing terminal, an information processing system, a display control method, and a recording medium.

2. Description of the Related Art

In an information processing terminal such as a smartphone and a tablet-type terminal, a user can freely install an application so as to expand the functions of the information processing terminal. Furthermore, such an information processing terminal can display an expressive Graphic User Interface (GUI) and provide superior operability using the touch panel thereof.

SUMMARY OF THE INVENTION

According to an aspect of the present invention, a device includes an operation unit; a first processing unit sending a display request for displaying a configuration element of a screen; a detection unit detecting a change of an authentication state of a user for the device; a first communication unit receiving the display request, designating identification information identifying the configuration element, and transmitting the display request for displaying the configuration element to the operation unit or transmitting notification information indicating the change of the authentication state to the operation unit. Further, the operation unit includes a second communication unit receiving the display request or the notification information, and a second processing unit displaying the configuration element, which is related to the identification information designated in the display request received by the second processing unit, in a form that is different from a form designated in the display request received by the first communication unit, or changing a display manner of the configuration element in accordance with the notification information.

BRIEF DESCRIPTION OF THE DRAWINGS

Other objects, features, and advantages of the present invention will become more apparent from the following description when read in conjunction with the accompanying drawings, in which:

FIG. 8 is a sequence diagram of an example procedure of an example process of generating an operation screen in response to start-up of an SDK application;

FIG. 10 is a sequence diagram of an example procedure of a process executed depending on an operation of a display part on the operation screen;

FIG. 13 is a sequence diagram of an example procedure when a soft keyboard is displayed;

FIG. 14 is a sequence diagram of an example procedure of a process executed in response to an input of a character string;

FIG. 17 is a sequence diagram of an example procedure of a process of notifying the rich UI application of a change of an authentication state of the image forming apparatus;

FIG. 18 is a table illustrating an example configuration of the notification information of the change of the authentication state; and FIG. 19 is sequence diagram of an example procedure of a registration release process of the authentication listener.

DETAILED DESCRIPTION OF THE PREFERRED EMBODIMENTS

The inventor of the present invention has studied a use of an information processing terminal, where a user can freely install an application to expand the functions thereof, so that the information processing terminal can serve as an operation section of a device (an apparatus) such as an image forming apparatus. To that end, for example, it was determined to make it possible to display the operational screens of various application programs, which can be executed in devices (apparatuses), on the information processing terminal. On the other hand, however, there are many application programs already available in the market. Therefore, it is desired to cause the information processing terminal to be operated as the operation section while avoiding the influence of those application programs (resources) as much as possible. To that end, it is supposed to cause the information processing terminal to emulate the conventional operation section of a device (an apparatus).

However, if the simulation of the operation section is just merely represented, it may become difficult to fully realize, for example, the advantages of the superior operability by the expressive GUI of the information processing terminal. This is because the screens to be displayed by the emulation are limited to screens which are determined based on the display capability of the conventional operation section. Therefore, if the emulation is just merely performed, the significance (advantages) of causing the information processing terminal to function as the operation section may be lost.

The present invention is made in light of the above problem, and may improve the operability of the operation section of a device (an apparatus).

Figure 1:
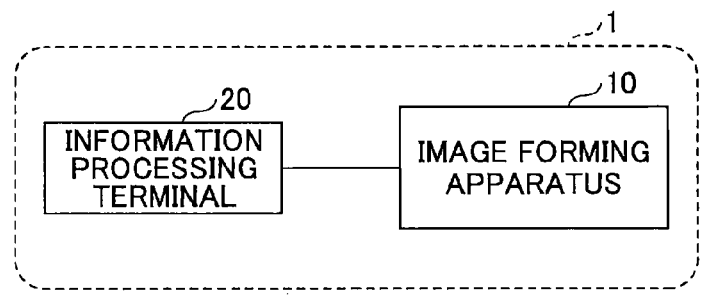
FIG. 1 illustrates an example configuration of an information processing system according to an embodiment.

In the following, embodiments of the present invention are described with reference to the accompanying drawings. FIG. 1 illustrates an example configuration of an information processing system according to an embodiment. As shown in FIG. 1, an information processing system 1 includes an image forming apparatus 10 and an information processing terminal 20 which are in communication with each other. The communications between the image forming apparatus 10 and the information processing terminal 20 are provided via a network such as a Near Field Communication, a (wireless or wired) Local Area Network (LAN), etc. using, for example, a Universal Serial Bus (USB).

The image forming apparatus 10 refers to a multifunction peripheral, which realizes (provides) two or more functions selected from a group including the functions of a printer, a scanner, a copier, and a facsimile machine. However, the image forming apparatus 10 may be used as a device (an apparatus) having only one of these functions. Further, it should be noted that the image forming apparatus 10 according to this embodiment is an example of a device (an apparatus). Namely, a device (an apparatus) such as, for example, a projector, a video conference system (aka: a TV conference system), a digital camera or the like may alternatively be used as the image forming apparatus 10.

The information processing terminal 20 refers to an electronic device (an electronic apparatus), which can execute a closed information processing by itself, such as a smartphone, a tablet-type terminal, etc. In this embodiment, the information processing terminal 20 serves as the operation section of the image forming apparatus 10. More specifically, the information processing terminal 20 is in connection with the image forming apparatus 10 in place of an operation panel which has been conventionally provided as an operation section dedicated to the image forming apparatus 10. Hereinafter, the term "operation panel" refers to the operation panel that has been provided in a conventional image forming apparatus 10.

The information processing terminal 20 may be installed (provided) so as to be fixed to a predetermined position (e.g., at the position where the operation panel is to be disposed) in the image forming apparatus 10. In this regard, the information processing terminal 20 and the image forming apparatus 10 may be regarded as a single device (apparatus). Further, the information processing terminal 20 may be provided so as to be detached (separated) from the image forming apparatus 10. While being detached from the image forming apparatus 10, the information processing terminal 20 may serve as the operation section of the image forming apparatus 10 via wireless communications such as the Bluetooth (registered trademark) or infrared communications.

Figure 2:
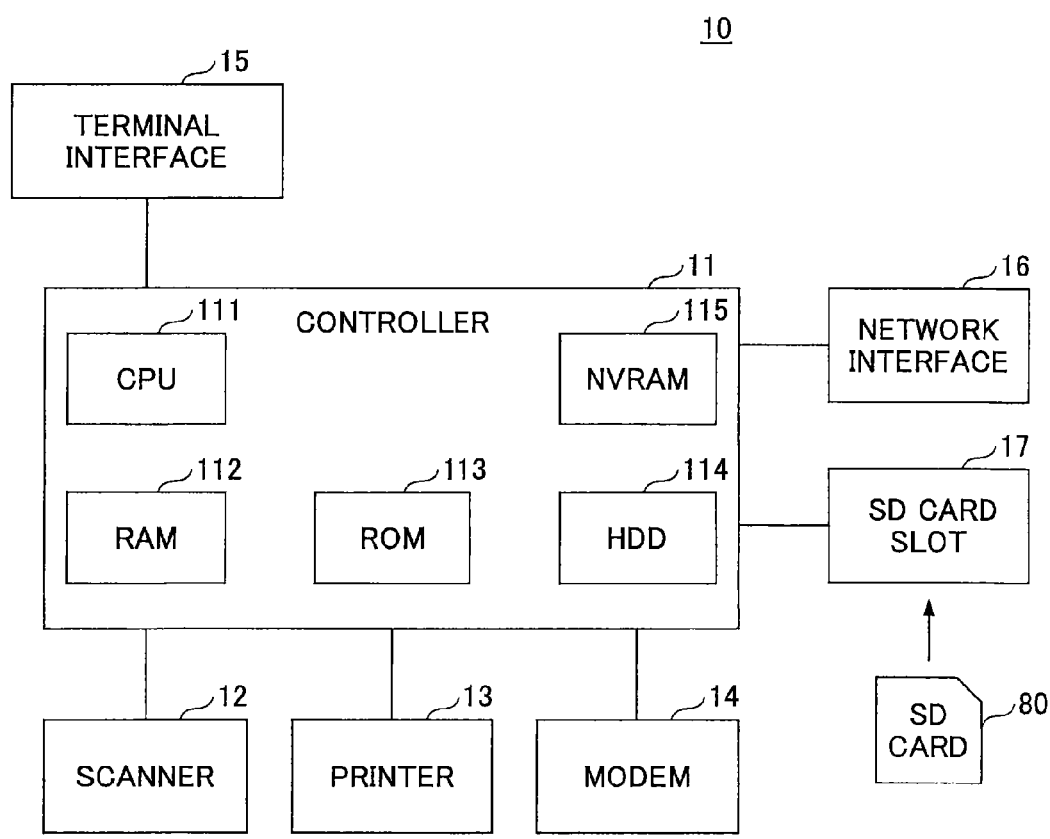
FIG. 2 illustrates an example hardware configuration of an image forming apparatus according to an embodiment.

FIG. 2 illustrates an example hardware configuration of the image forming apparatus 10 according to an embodiment. As shown in FIG. 2, the image forming apparatus 10 includes a controller 11, a scanner 12, a printer 13, a modem 14, a terminal interface 15, a network interface 16, and an SD card slot 17 as hardware elements.

The controller 11 includes a Central Processing Unit (CPU) 111, a Random Access Memory (RAM) 112, a Read-Only Memory (ROM) 113, a Hard Disk Drive (HDD) 114, and a Non Volatile RAM (NVRAM) 115. The ROM 113 stores various programs and data to be used by the programs and the like. The RAM 112 is used as a storage area for loading a program and as a working area of the loaded program. The CPU 111 executes the program loaded into the RAM 112, so as to realize various functions. The HDD 114 stores, for example, the programs and various data to be used by the programs. The NVRAM 115 stores various setting information.

The scanner 12 is a hardware (image reading (recognition) unit) to read image data from a manuscript. The printer 13 a hardware (print unit) to print data on a print sheet. The modem 14 is a hardware to connect to a telephone line, and is used to transmit and receive image data in a facsimile communication. The terminal interface 15 is an interface for communication (connection) with the information processing terminal 20. For example, the terminal interface 15 may be a USB interface or hardware for near field communication. Otherwise, the terminal interface 15 may be a hardware for connection with a (wireless or wired) network such as a LAN. The network interface 16 is a hardware for connection with a (wireless or wired) network such as the LAN. The SD card slot 17 is used to read a program stored in an SD card 80. Namely, in the image forming apparatus 10, not only a program stored in the ROM 113 but also a program stored in the SD card 80 can be loaded into the RAM 112 and executed. A recording medium other than the SD card 80 such as a CD-ROM or a USB memory may alternatively be used. Namely, a type of the recording medium corresponding to the SD card 80 in this embodiment is not limited to a specific one. In this case, the SD card slot 17 is replaced by a hardware corresponding to the type of the recording medium to be used.

Figure 3:
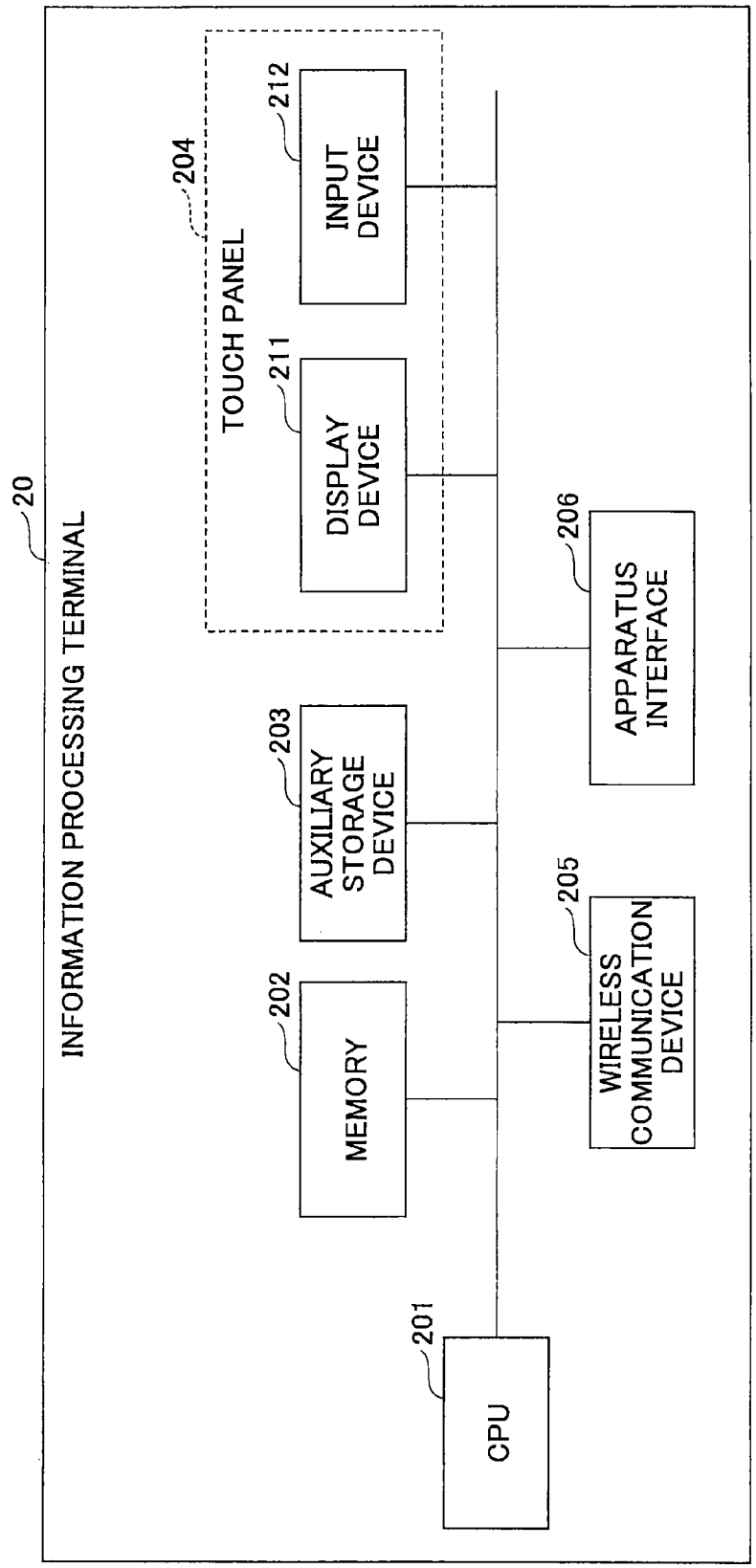
FIG. 3 illustrates an example hardware configuration of an information processing terminal according to an embodiment.

FIG. 3 illustrates an example hardware configuration of the information processing terminal 20 according to an embodiment. As shown in FIG. 3, the information processing terminal 20 includes a CPU 201, a memory 202, an auxiliary storage device 203, a touch panel 204, a wireless communication device 205, and an apparatus interface 206.

The auxiliary storage device 203 stores, for example, a program installed in the information processing terminal 20. Upon an instruction to start a program, the program is read from the auxiliary storage device 203 and stored in the memory 202. The CPU 201 realizes functions of the information processing terminal 20 in accordance with the program stored in the memory 202.

The touch panel 204 is an electronic device having both an input function and a display function, so as to, for example, display information and accept an input from a user. The touch panel 204 includes a display device 211 and an input device 212.

The display device 211 is, for example, a liquid crystal display (LCD) and provides a display function of the touch panel 204. The input device 212 is an electronic device including a sensor to detect a contact of a contact object to the display device 211. As a method of detecting the contact object to the display device 211, any appropriate known method may be used such as an electrostatic method, a resistance film method, or an optical method. Here, the term "contact object" refers to an object being in touch with the surface (contact surface) of the touch panel 204. The "contact object" may be referred to, for example, a user's finger and a dedicated or general pen.

The wireless communication device 205 is an electronic device such as an antenna which is necessary for a communication in a wireless LAN or a mobile communication network. The apparatus interface 206 is an interface for a communication with the image forming apparatus 10. Namely, the apparatus interface 206 corresponds to the type of the terminal interface 15 so as to be in communication with the image forming apparatus 10.

Figure 4:
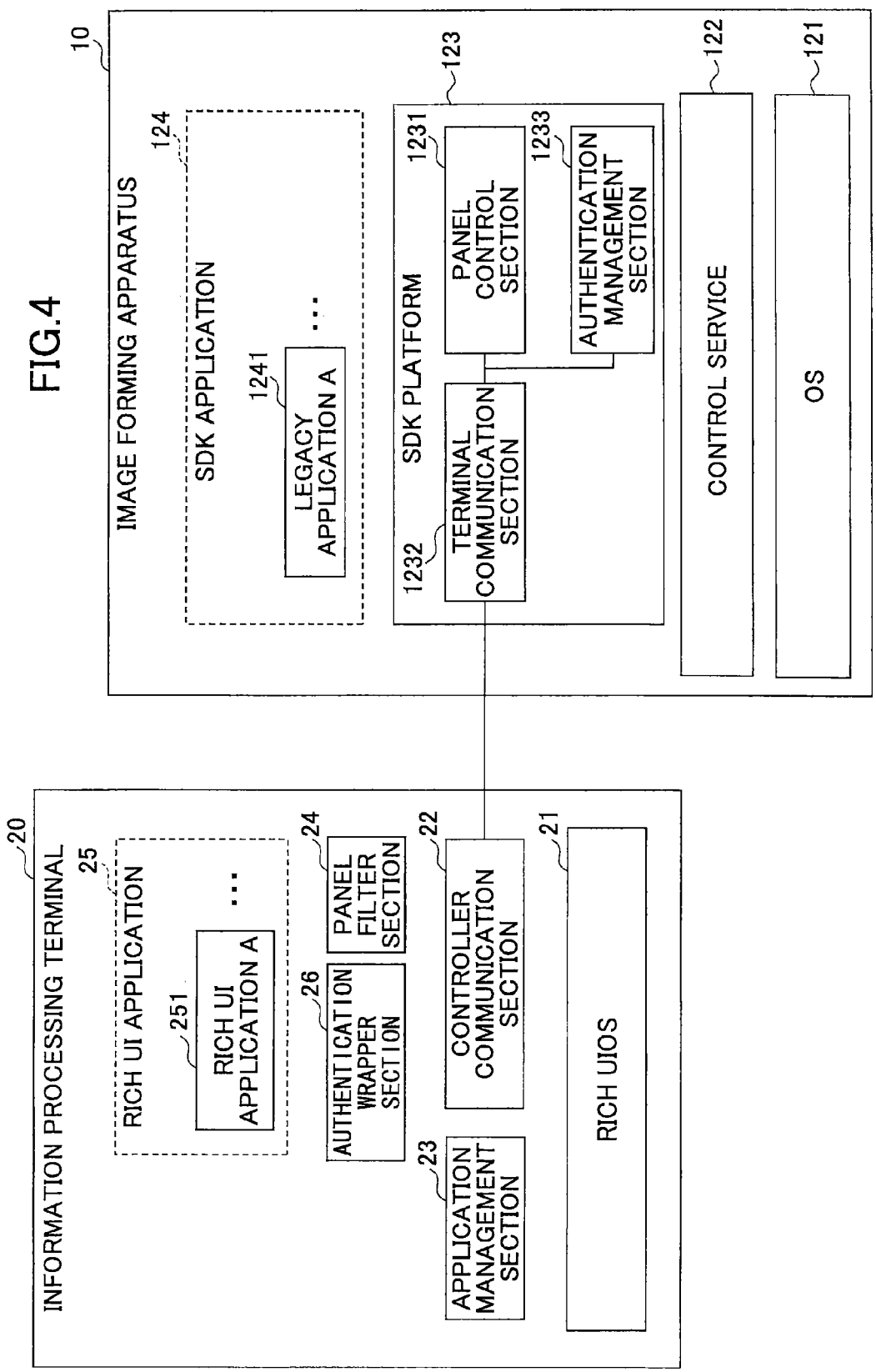
FIG. 4 illustrates an example functional block diagram of the information processing system according to an embodiment.

FIG. 4 illustrates an example functional block diagram of an information processing system according to an embodiment. As shown in FIG. 4, the image forming apparatus 10 of the information processing system includes an OS 121, a control service 122, a software development kit (SDK) platform 123, and an SDK application 124.

The OS 121 refers to a so-called "operating system" (OS). Software on the image forming apparatus 10 is operated as a process or a thread on the OS 121.

The control service 122 refers to a software module group having functions to control various types of hardware resources and providing an interface to make it possible for an upper-level application or the like to use the functions. For example, the control service 122 has a function related to a network communication, a function to control the scanner 12, a function to control the printer 13, a function to manage the memory (e.g., the RAM 112, the ROM 113, and the NVRAM 115). Further, the control service 122 has a function to control the operation panel.

The SDK platform 123 includes an Application Program Interface (API) to develop the SDK application 124 and provides an execution environment for the SDK application 124. Here, a type of the API may be, for example, a function, an object-oriented class, or a method of the class. In the following, an API provided by the SDK platform 123 is called an "SDKAPI". For example, the SDK platform 123 provides an SDKAPI of a scan function, an SDKAPI of a print function, and an SDKAPI of a copy function to the SDK application 124. The SDKAPI is published, so that a third party may also develop the SDK application 124. Here, the SDK platform 123 may include Java (registered trademark) and Virtual Machine (VM). In this case, the SDK application 124 is written (developed) in Java (registered trademark) language.

In this embodiment, for convenience sake, the SDK application 124 and the SDK platform 123 are exemplarily described as the program that can be installed into the image forming apparatus 10. However, it should be noted that the program that can be installed in the image forming apparatus 10 is not limited to, for example, the SDK application 124 and the SDK platform 123. Namely, a program other than the SDK application 124 and the SDK platform 123 may be installed into the image forming apparatus 10, and such a program that can be installed into the into the image forming apparatus 10 may be included in all the programs that are to be installed into the image forming apparatus 10.

In FIG. 4, the SDK platform 123 includes a panel control section 1231, a terminal communication section 1232, an authentication management section 1233. The primary task of the panel control section 1231 is to perform display control of the operation panel. Namely, the panel control section 1231 provides the SDKAPI for display control of the operation panel (hereinafter "SDK panel API"), and perform the display control in response to a call of the SDK panel API. For example, the panel control section 1231 sends a request for changing a display state of a display part from the SDK application 124 to the control service 122. As a result, the display state of the display part on the operation panel is changed by the control service 122. The change of the display state of the display part herein includes, for example, whether the display part is to be displayed and the reversed display of the display part.

The panel control section 1231 in this embodiment executes a process so that change of the display state, which is in response to the request for the display control of the operation panel, is reflected in the information processing terminal 20. For example, the panel control section 1231 sends the request for changing the display state of the display part from the SDK application 124 to the information processing terminal 20 via the terminal communication section 1232. As a result, it becomes possible to cooperate (link) or synchronize the display control by the SDK application 124 with the display control by a rich user interface (UI) application 25 in the information processing terminal 20.

The term "display part" herein refers to various parts which become the configuration elements in a screen. The display part is displayed when, for example, a process (job) is to be executed in the image forming apparatus 10. The display part includes, for example, a button, a soft key, a soft keyboard, a window, and a label to display characters. The soft key herein refers to a software key group which is displayed to accept the input of characters on a smartphone, a tablet-type terminal and the like.

For example, the authentication management section 1233 manages a user's authentication state in the image forming apparatus 10. To that end, for example, the authentication management section 1233 notifies the SDK application 124 of the information reporting the change of the authentication state of a user's login to or logout from the image forming apparatus 10. Further, the authentication management section 1233 transmits the information to the information processing terminal 20 via the terminal communication section 1232.

The terminal communication section 1232 controls the communications with the information processing terminal 20. The terminal communication section 1232 is in communication with the information processing terminal 20 based on, for example, the HyperText Transfer Protocol (HTTP). However, the communication protocol used for the communications between the image forming apparatus 10 and the information processing terminal 20 may not be limited to HTTP.

The SDK application 124 herein refers to an application program (aka a "plug-in") which is additionally installed to expand the functions of the image forming apparatus 10 after the shipment of the image forming apparatus 10. In FIG. 4, as the SDK application 124, a legacy application A 1241 is exemplarily illustrated. The legacy application A 1241 sends a request to the panel control section 1231 to display an operation screen and execute a predetermined process in accordance with an input to the operation screen. Here, the term "legacy" of the legacy application A 1241 is added for convenience sake as a comparative word to be compared with the term "rich" of the rich UI application 25 described blow. Therefore, it is to be understood that the use of the term "legacy" does not limit, for example, the function and the use application of the "legacy application A 1241".

On the other hand, the information processing terminal 20 includes a rich UIOS 21, a controller communication section 22, an application management section 23, a panel filter section 24, the rich UI application 25, and an authentication wrapper section 26.

The rich UIOS 21 is an Operating System (OS) which can provide an expressive GUI having an excellent operability. For example, the rich UIOS 21 may be an OS which is used in a smartphone, a tablet-type terminal or the like which has been used recently.

The controller communication section 22 controls the communications with the terminal communication section 1232 of the image forming apparatus 10. The application management section 23 manages the relationships between the rich UI application 25 and the SDK application 124.

The panel filter section 24 provides the rich UI application 25 with an interface which is used to cooperate (link) or synchronize the display control between the rich UI application 25 and the SDK application 124.

The authentication wrapper section 26 notifies the rich UI application 25 of the information from the authentication management section 1233 indicating the change of the authentication state.

The rich UI application 25 herein refers to an application program which is installed into the information processing terminal 20 to reflect the display control, which is applied to the operation panel by the SDK application 124, to the information processing terminal 20. Basically, there are one-to-one relationships between the rich UI application 25 and the SDK application 124. For example, in the case of FIG. 4, a rich UI application A 251 is the rich UI application 25 so that the legacy application A 1241 is realized on the rich UIOS 21.

Here, the term "rich" in the rich UIOS 21 and the rich UI application 25 is added for convenience sake as a comparative word to be compared with the term "legacy" of the legacy application A 1241. Therefore, it is to be understood that the use of the term "rich" does not limit, for example, the function and the use application of the "rich UIOS 21" and the "rich UI application 25".

Figure 5:
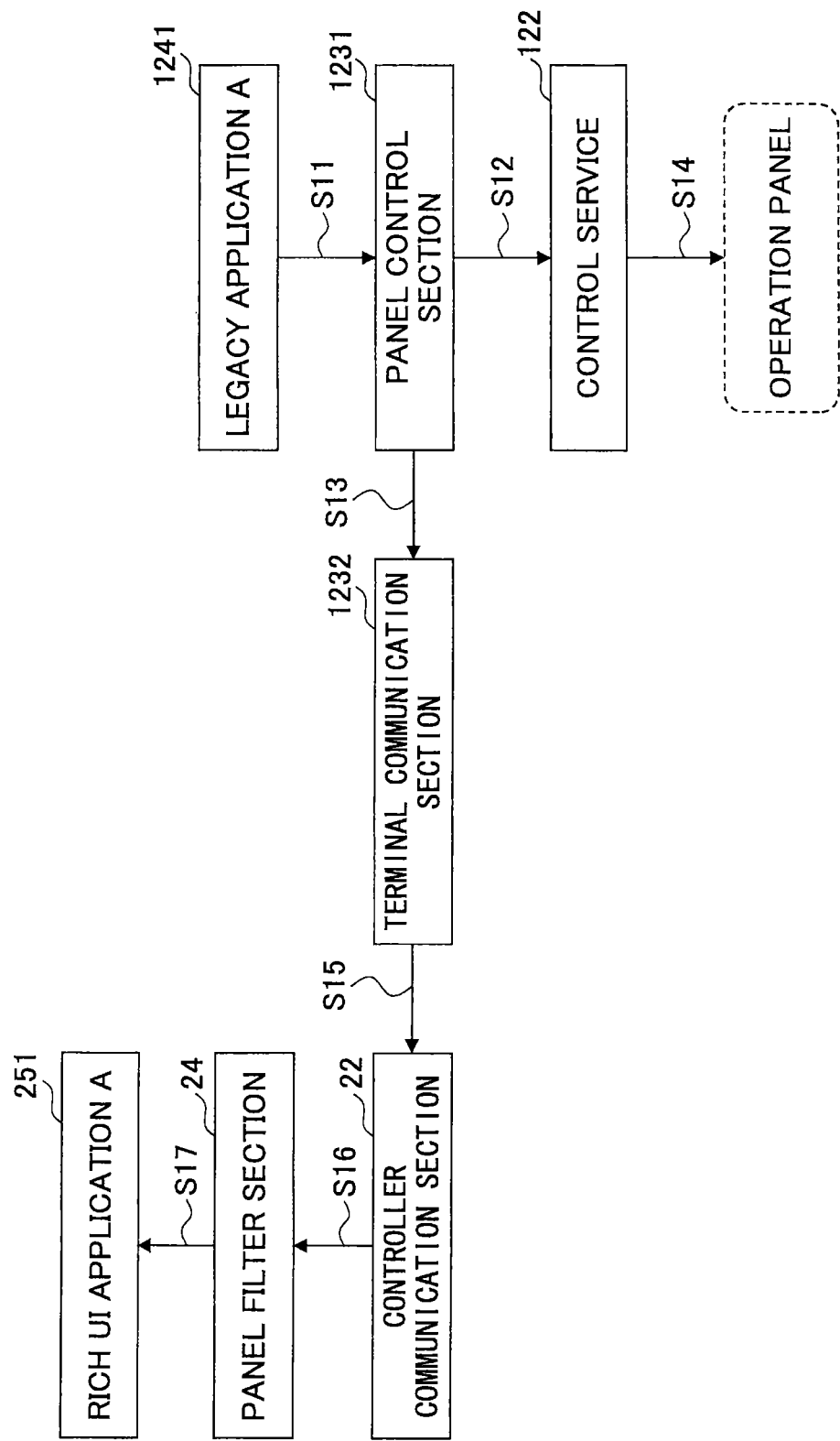
FIG. 5 illustrates an example display mechanism of the information processing system.

Next, details of a display mechanism in the information processing system 1 are further described. FIG. 5 illustrates a display mechanism in the information processing system 1.

When the legacy application A 1241 sends a request to the panel control section 1231 so as to generate a certain display part (hereinafter "display part A") (step S11), the panel control section 1231 sends a request to the control service 122, so as to generate (display) the display part A (step S12), and also sends another request to the terminal communication section 1232 so as to notify that the display part A has been generated (step S13).

In response to the request for the generation of the display part A, the control service 122 the display part A in the same manner as when the operation panel is provided (installed) (step S14). However, actually, the operation panel is not provided in this case, therefore the generated display part A is not displayed.

On the other hand, the terminal communication section 1232 transmits the notification of the generation of the display part A to the controller communication section 22 (step S15). The controller communication section 22 notifies the panel filter section 24 of the generation of the display part A (step S16). The panel filter section 24 sends a request to the rich UI application A 251 so as to generate the display part A (step S17). The rich UI application A 251 generates the display part A. The generated display part A is displayed on the touch panel 204. Here, how the "display part A" is generated as the display part by the rich UI application A 251 depends on how the rich UI application A 251 is implemented. In this regard, for example, even when the "display part A" is generated (processed) as a button by the legacy application A 1241, the "display part A" may be generated as another display part that can be expressed on the rich UIOS 21 by the rich UI application A 251. Namely, the rich UI application A 251 may generate a display part whose figure (form, type) is different from that of the display part which is designated when the legacy application A 1241 sends the request to the panel control section 1231 for the generation of the display part. By doing this, unlike the merely simple emulation, it becomes possible to provide a GUI where excellent expressive ability by the rich UIOS 21 can be sufficiently used.

As may be apparent from FIG. 5, most of the influences caused by using the information processing terminal 20 in place of the operation panel relies on (found in) the SDK platform 123 and the control service 122 etc. Therefore, it becomes possible to reduce the necessity of the modification of the SDK application 124 which is an existing resource.

Figure 6:
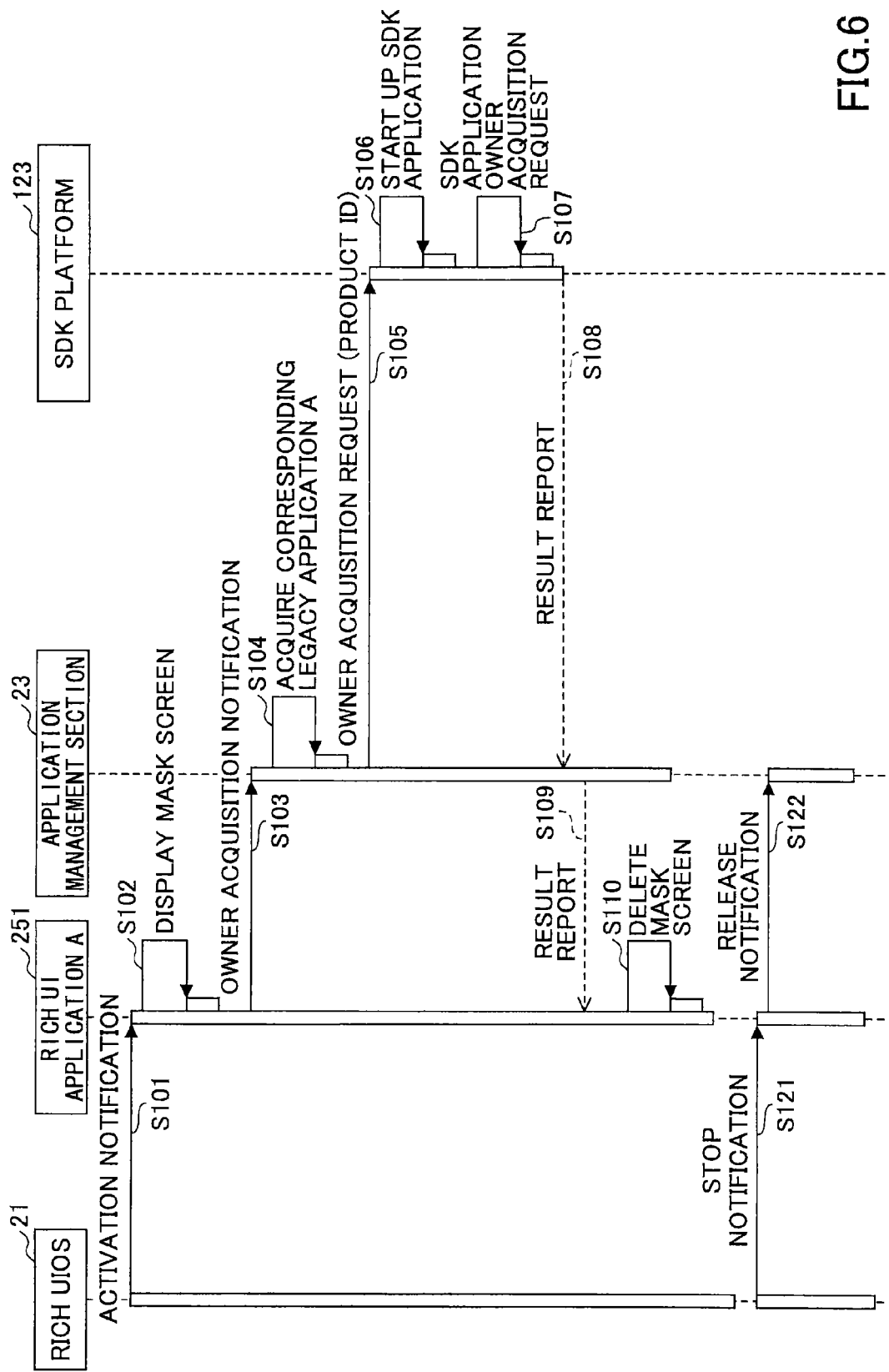
FIG. 6 is a sequence diagram of an example procedure when an application is started and stopped.

In the following, an example procedure executed by the information processing system 1 is described. FIG. 6 is a sequence diagram of an example procedure when an application is started and stopped.

For example, in a home screen (initial screen) displayed on the touch panel 204 of the information processing terminal 20, when an icon of the rich UI application A 251 is touched, the rich UIOS 21 notifies the rich UI application A 251 corresponding to the touched icon of an "activated state" (step S101). Herein, the term "activated state" refers to that it is entitled to occupy the display area of the screen as an operation target.

Figure 7A:
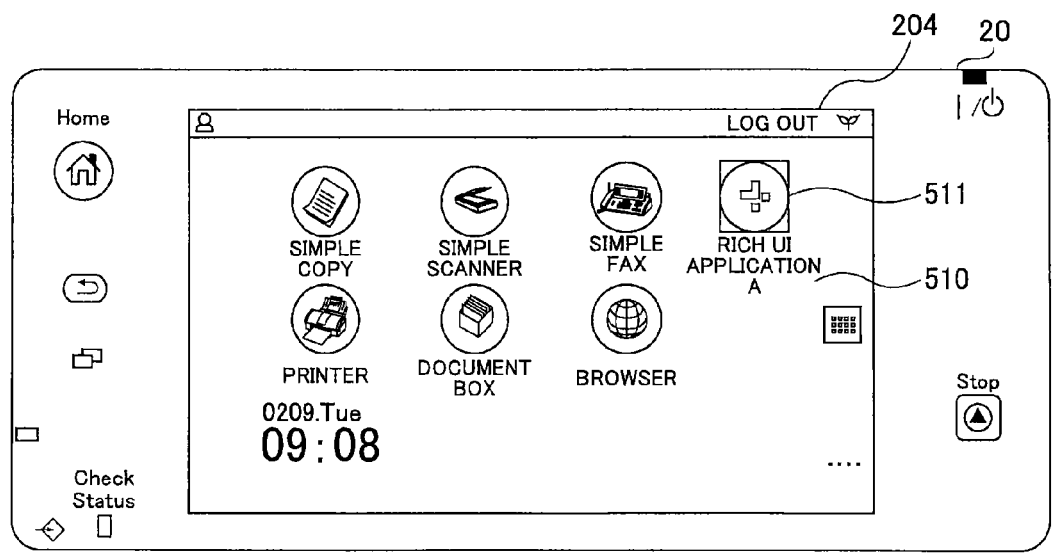
FIGS. 7A and 7B illustrate example home screens.
Figure 7B:
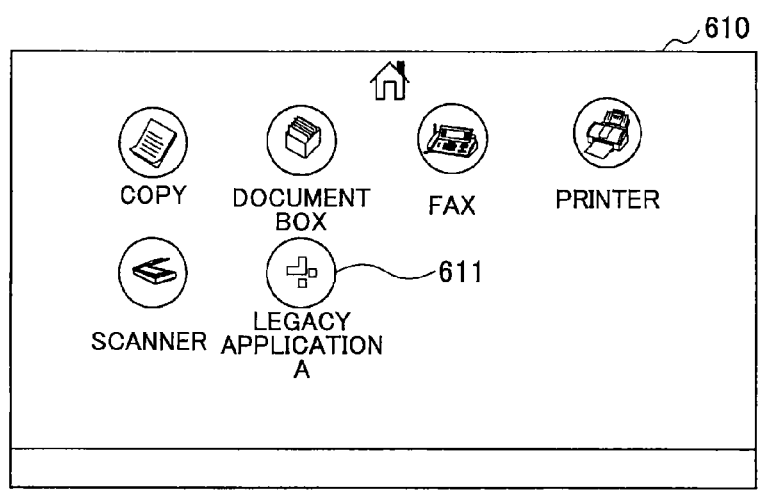

FIGS. 7A and 7B illustrate example displays of the home screens. FIG. 7A illustrates an example display of a home screen 510 on the touch panel 204 of the information processing terminal 20. FIG. 7B illustrates an example display of a home screen 610 which is virtually generated in the image forming apparatus 10 just for a reference.

For example, when an icon 511 is selected on the touch panel 204, the process of step S101 is executed. Here, the icon 511 corresponds to an icon 611 on the home screen 610.

Next, the rich UI application A 251 displays a mask screen on the touch panel 204 (step S102). Here, the term "mask screen" refers to a screen which is displayed so as to hide an operation screen displayed on the touch panel 204 in response to a request from the SDK application 124 so as to cause the rich UI application A 251 to control a timing to visualize the operation screen. To that end, for example, a message such as "please wait for a while" may be displayed in the mask screen.

Next, the rich UI application A 251 notifies the application management section 23 of "owner acquisition" while designating the application ID of the rich UI application A 251 (step S103). The Application ID is identification information to identify the rich UI application 25. Further, the term "owner acquisition" herein refers to the acquisition of the position (status) of the owner (occupant) of the display area of the screen, and has substantially the same meaning of the "activated state".

Next, the application management section 23 determines the product ID of the SDK application 124 corresponding to the application ID designated in the notification of the owner acquisition (step S104). Specifically, the auxiliary storage device 203 of the information processing terminal 20 stores a setting file for each rich UI application 25. The setting file stores the application ID of the rich UI application 25 related to the setting file in association with the product ID of the SDK application 124 corresponding to the rich UI application 25. Therefore, the application management section 23 acquires the product ID based on the setting file corresponding to the application ID designated in the notification of the owner acquisition. The term "product ID" herein refers to identification information to identify the SDK application 124.

Further, in step S103, the rich UI application A 251 may notify the application management section 23 of the owner acquisition while designating the product ID of the of the SDK application 124 corresponding to the rich UI application A 251. In this case, the rich UI application A 251 may acquire the product ID based on the setting file thereof, and the product ID may be described in the source code of the rich UI application A 251. When the product ID is designated based on the rich UI application A 251, the process of step S104 may not be executed.

Next, while designating the acquired product ID, the application management section 23 sends a request to the SDK platform 123 for the owner acquisition related to the SDK application 124 (legacy application A 1241) corresponding to the product ID (step S105). Here, the owner acquisition request, which is transmitted to the SDK application 124 related to the designated product ID, is a request for acquiring the position of the owner (step S105). In the case of the SDK application 124, the position of the owner refers to the position of the owner in the display area of the screen relative to the operation panel. Further, although omitted in FIG. 6, the application management section 23 and the SDK platform 123 are in communication with each other via the controller communication section 22 and the terminal communication section 1232.

Next, the SDK platform 123 starts up the legacy application A 1241 related to the product ID designated in the owner acquisition request (step S106). Here, if the legacy application A 1241 is already started up, the process in step S106 is skipped. As an example of the case where the legacy application A 1241 is already started up, the procedure in FIG. 6 has been done at least once after the image forming apparatus 10 is started up.

The started-up legacy application A 1241 starts a generation process of generating an operation screen of the legacy application A 1241. As a result, a display part, which is generated in the generation process, is displayed on the touch panel 204 based on the mechanism described with reference to FIG. 5. This procedure, however, is described below. Further, in this time point, the mask screen is displayed on the touch panel 204, the display parts are hidden (covered), so that a user cannot see the display parts.

Next, the SDK platform 123 sends a request for the owner acquisition of the legacy application A 1241 to the control service 122 (step S107). This is because the position of the owner of the operation panel is managed by the control service 122 which performs display control on the operation panel.

Next, the SDK platform 123 sends a response to the application management section 23, the response indicating whether the owner acquisition of the legacy application A 1241 is successful (step S108). The application management section 23 sends the response (information) to the rich UI application 25, the response (information) indicating whether the owner acquisition of the legacy application A 1241 is successful (step S109).

When the owner acquisition of the legacy application A 1241 is successful, the rich UI application 25 deletes the mask screen (step S110). As a result, an operation screen generated under the mask screen is displayed, so that a user can operate the legacy application A 1241 via the operation screen generated by the rich UI application A 251.

After that, when the use of the rich UI application A 251 is finished and the user inputs an instruction to stop the rich UI application A 251, the rich UIOS 21 inputs the stop notification into the rich UI application A 251 (step S121). In response to the stop notification, the rich UI application A 251 becomes inactive. As a result, the operation screen is deleted, and the touch panel 204 displays, for example, the home screen 510. Then, the application A 251 notifies the application management section 23 of the release of the owner (release of the position of the owner) (step S122).

Further, on the image forming apparatus 10 side, the legacy application A 1241 remains the owner, so that there exists a mismatch in the owner between the image forming apparatus 10 and the information processing terminal 20. However, when another rich UI application 25 becomes active and the process from step S101 is executed, the SDK application 124 corresponding to the rich UI application 25 becomes the owner, so that the mismatch is resolved. Further, regarding the owner, it is not always desired that the image forming apparatus 10 and the information processing terminal 20 are synchronized with each other. Therefore, in this embodiment, after step S122, the owner release request of the legacy application A 1241 is not sent to the SDK platform 123.

Next, the generation process of generating the operation screen in response to the start-up of the SDK application 124 (legacy application A 1241) in step S105 is described, FIG. 8 is a sequence diagram of an example generation process of generating the operation screen in response to the start-up of the SDK application 124.

In step S201, the SDK platform 123 starts up the legacy application A 1241. Here, the process in step S201 corresponds to that in step S105 of FIG. 6. In response to the start-up, the legacy application A 1241 starts the generation process of generating the operation screen (step S202). In the middle of the generation process of generating the operation screen, the legacy application A 1241 sends a request to the panel control section 1231 to generate the display part for each of the display part which is an element included in the operation screen (step S203). In the request for generating the display part, a component ID is designated which is the identification information for each unit of the display parts. The term "identification information for each unit" herein refers to the identification information which has a unique (different) value for each of the display parts even when the type of the display parts are the same (e.g., even when the type of the display parts is the button).

The panel control section 1231 sends a request to the terminal communication section 1232 to notify the generation of the display part including the designated component ID (step S204). Here, as described with reference to FIG. 5, the panel control section 1231 sends a request to the control service 122 to generate the display part. In FIG. 8, this process is omitted for convenience sake.

The terminal communication section 1232 sends the generation notification of the generation of the display part with designated component ID to the panel filter section 24 (step S205). Here, in FIG. 8, the controller communication section 22 is omitted for convenience sake. The panel filter section 24 notifies the rich UI application A 251 of the generation of the display part with the designated component ID (step S206). Further, the rich UI application A 251 registers notification destination in the panel filter section 24 in advance, the notification destination being used to receive a notification from the panel filter section 24 when, for example, the rich UI application A 251 becomes active. Generally, the notification destination is the function, the method or the like called "call-back" or "listener". The panel filter section 24 realizes the notification of the generation of the display part to the rich UI application A 251 by notifying the notification destination of the generation of the display part.

Next, the rich UI application A 251 generates the display part corresponding to the designated component ID (step S207).

Further, it is supposed that the rich UI application A 251 already knows which display part related to the component ID corresponds to which display part related to the legacy application A 1241. For example, a developer of the rich UI application A 251 may be the same person as a developer of the legacy application A 1241, or may be a person who understands the source code of the legacy application A 1241. Therefore, the developer of the rich UI application A 251 can study which (type of the) display part can be appropriately used on the rich UIOS 21 to express the display part related to the component ID, and determine (the type of) the display part to be generated by the rich UI application A 251 in accordance with the component ID.

When the processes after step S203 are performed for all the display parts included in the operation screen, the operation screen of the legacy application A 1241 is reproduced on the touch panel 204 of the information processing terminal 20 by the rich UI application A 251.

Figure 9A:
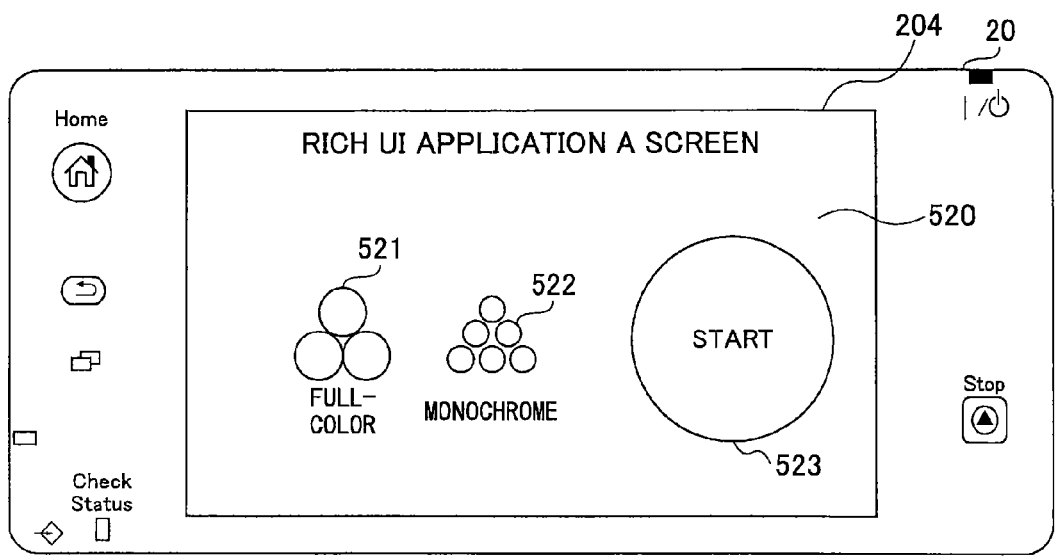
FIGS. 9A and 9B illustrate example operation screens.
Figure 9B:
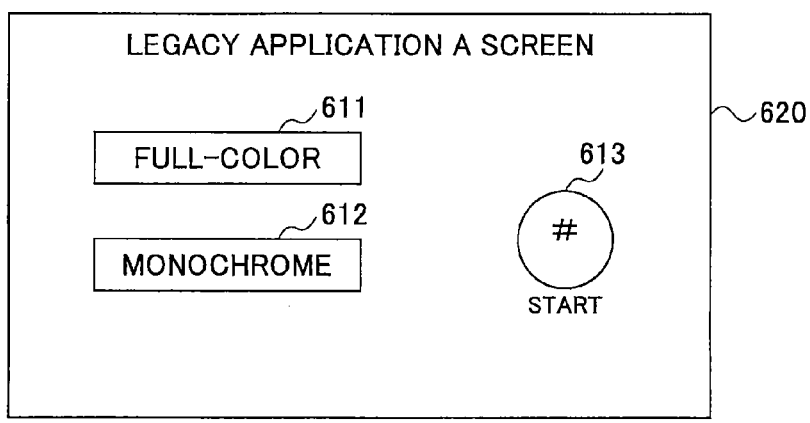

FIGS. 9A and 9B illustrate example displays of the operation screen. FIG. 9A illustrates an example operation screen 520 displayed on the touch panel 204 of the information processing terminal 20. For reference only, FIG. 9B illustrates an example operation screen 620 of the legacy application A 1241 virtually generated in the image forming apparatus 10.

For example, the buttons 611 and 612 in the operation screen 620 are replaced by the icons 521 and 522 in the operation screen 520. Further, the button 613 in the operation screen 620 is replaced by the button 523 in the operation screen 520. As described above, the rich UI application A 251 can generate the display part having a figure different from that generated by the legacy application A 1241. By doing this, it becomes possible to generate an expressive operation screen providing enhanced operability.

From the view point of a user, when the user touches the icon 511 in the home screen 510 of FIG. 7A, the operation screen is transited to the operation screen of FIG. 9A.

Next, an example procedure executed in accordance to an operation to the display part in the operation screen 520 is described. FIG. 10 is a sequence diagram of an example procedure executed in accordance to an operation to the display part in the operation screen 520.

For example, in the operation screen 620, when any of the display parts is operated (step S301), the rich UI application A 251 notifies the panel filter section 24 of an action event which is the information including display part and the operation content (operation type) applied to the display part (step S302). The panel filter section 24 transmits the action event to the panel control section 1231 (step S303), and reports the acceptance of the action event to the rich UI application A 251 (step S304).

On the other hand, the panel control section 1231 notifies the legacy application A 1241, which is the current owner, of the action event (step S305). Further, the legacy application A 1241 registers the notification destination in the panel control section 1231 in advance, the notification destination being used to receive a notification from the panel control section 1231 when, for example, the legacy application A 1241 becomes the owner. The panel control section 1231 realizes the notification of the action event to the legacy application A 1241 by notifying the notification destination of the action event.

Figure 11:
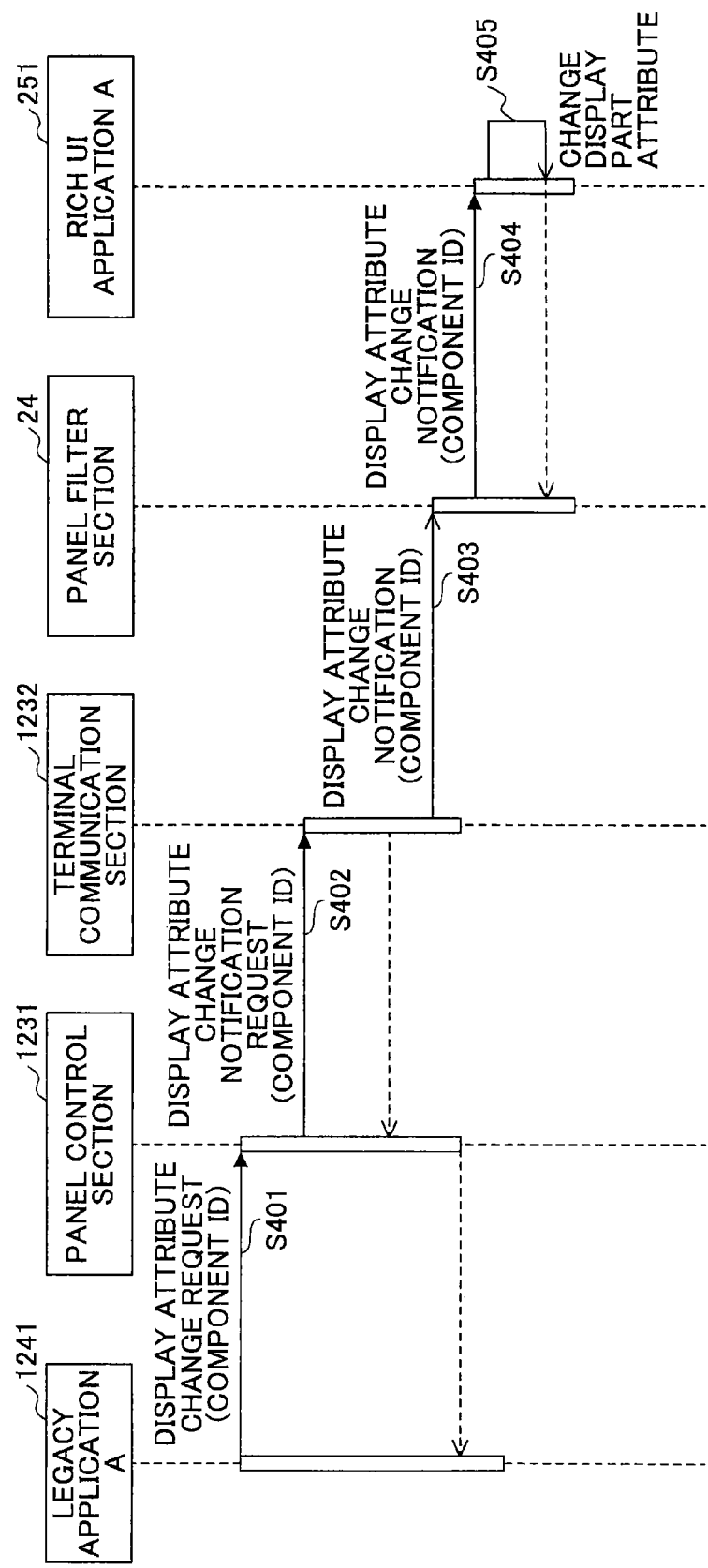
FIG. 11 is a sequence diagram of an example procedure of a process executed depending on an action event.

Next, an example procedure executed in accordance with the action event is described. FIG. 11 is a sequence diagram of an example procedure executed in accordance with the action event.

The legacy application A 1241, which receives the notification of the action event in step S305, executes a process in accordance of the action event. For example, when it is desired to change a display attribute (display state) of the display part to be operated, the legacy application A 1241 sends a request to the panel control section 1231 to change the display attribute by designating the component ID of the display part (step S401). Here, from the legacy application A 1241, the action event notified to the legacy application A 1241 in step S305 is an action event indicating an operation applied to any of the display parts in the operation screen 620 (FIG. 9B). Namely, the legacy application A 1241 does not recognize that the operation screen 520 corresponding to the operation screen 620 is display in the information processing terminal 20. Therefore, in step S401 which is executed in accordance with step S305, the same process is executed as the process executed when the legacy application A 1241 is used in the image forming apparatus 10 having the operation panel.

Next, the panel control section 1231 sends the request to the terminal communication section 1232 to send the request to change the display attribute including the designated component ID (step S402). Here, as described with reference to FIG. 5, the panel control section 1231 sends a request to the control service 122 to change the display attribute. In FIG. 11, this process is omitted for convenience sake.

The terminal communication section 1232 transmits the change notification of changing the display attribute with the designated component ID to the panel filter section 24 (step S403). In FIG. 11, the controller communication section 22 is omitted for convenience sake. The panel filter section 24 notifies the rich UI application A 251 of the change of the display attribute while designating the component ID in the same method as that in which the generation of the display part is notified (step S404). The rich UI application A 251 changes the display attribute of the display part corresponding to the designated component ID to a designated state (step S405). However, the type of the change is not strictly limited to the designated state. This is because when the type of the display part whose display attribute is to be changed is different between the display part in the legacy application A 1241 and the display part in the rich UI application A 251, the type of changing of the display attribute may be accordingly changed.

For example, in the operation screen 520 of FIG. 9, when the icon 521 is touched, the legacy application A 1241 determines that the icon 521 is to be changed (displayed) in a selected state (e.g., a reversed display). To that end, a change request for changing the display attribute to the selected state along with the designated component ID is notified to the legacy application A 1241 via the panel control section 1231, the terminal communication section 1232, the panel filter section 24 etc. Then, the legacy application A 1241 changes the display attribute of the icon 521 to the selected state. As a result, for example, the display state of the operation screen 520 is changed as shown in FIGS. 12A and 12B.

Figure 12A:
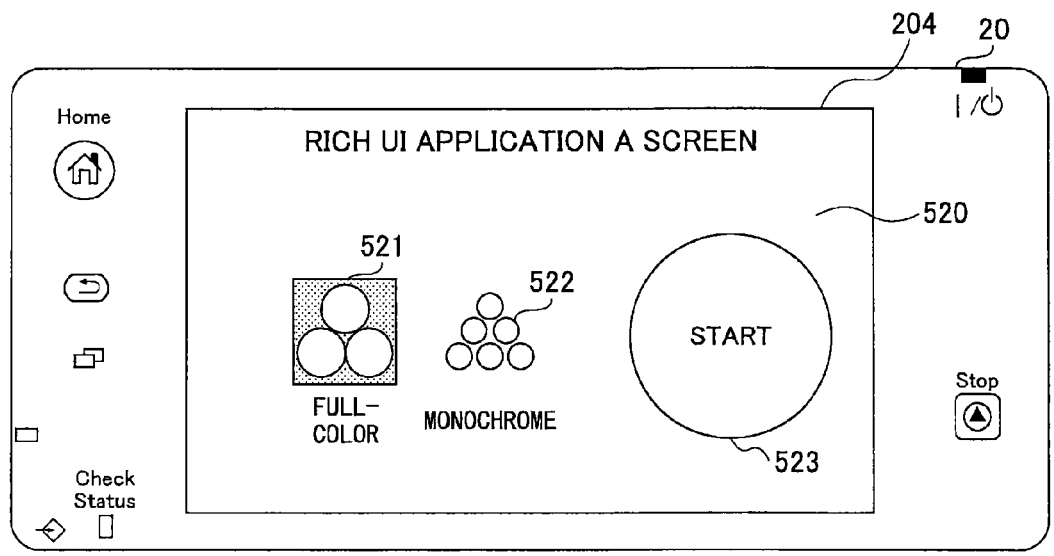
FIGS. 12A and 12B are modified examples of the display states of the operation screens.
Figure 12B:
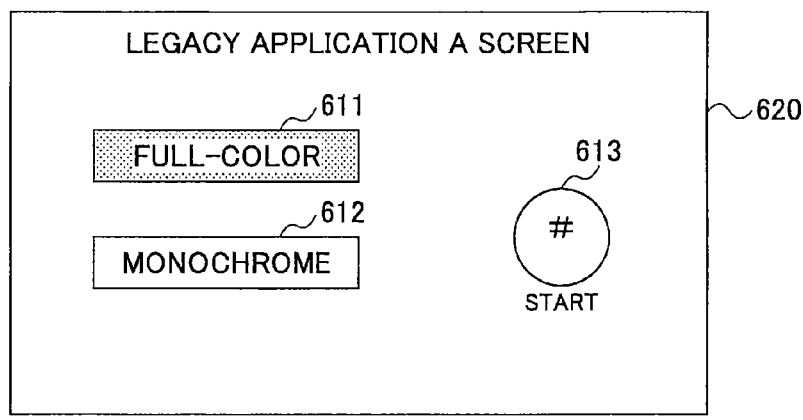

FIGS. 12A and 12B illustrate examples of changed display state of the operation screens. In the operation screen 520 of FIG. 12A, the icon 521 is displayed in the selected state. Further, as shown in FIG. 12B, in the operation screen 620 also which is virtually generated by the control service 122, it is recognized that the button 611 is to be displayed in the selected state.

Further, in the operation screen 520, if the button 523 is touched, the procedure of steps S301 through S305 is executed, and since the legacy application A 1241 already recognizes which of the buttons 521 and 522 is being selected in step S305, it becomes possible to cause the image forming apparatus 10 to execute a job corresponding to the state in which either the button 521 or the button 522 is selected.

Further, when it is desired to transit (change) screen in accordance with the operation to the display part, the procedure after step S202 of FIG. 8 is executed after step S305. As a result, a new screen is displayed on the touch panel 204.

Further, when it is desired to display a soft keyboard in accordance with the operation of the display part and transit (change) the state to a state where an input of a character string can be accepted, in place of the procedure of FIG. 11, a procedure of FIG. 13 is executed.

FIG. 13 is a sequence diagram of an example procedure when a soft keyboard is displayed.

When determining that it is desired to display a soft keyboard in response to the action event, the legacy application A 1241 sends a request to the panel control section 1231 so as to generate the soft keyboard (step S501). The panel control section 1231 sends a request to the control service 122 to generate the soft keyboard (step S502). As a result, the image forming apparatus 10 is in a state where the soft keyboard is virtually generated.

Next, the panel control section 1231 inputs a character string input request for inputting a character string to the terminal communication section 1232 (step S503). The terminal communication section 1232 transmits the character string input request to the panel filter section 24 (step S504). Further, in FIG. 13, the controller communication section 22 is omitted for convenience sake.

Next, the panel filter section 24 notifies the rich UI application A 251 of the character string input request (step S505). The rich UI application A 251 generates a screen to input a character string thereto using a display part that can be generated on the rich UIOS 21 (step S506). As a result, the screen to which a character string is input is displayed on the touch panel 204. Further, the screen may be the soft keyboard or may be another display part.

Next, in response to step S506, an example procedure is described which is executed when a user inputs a character string. FIG. 14 illustrates a sequence diagram of an example executed in response to the input of a character string.

In the screen for the input of a character string displayed on the touch panel 204, when the input of a character string by a user is confirmed (detected) (step S601), the rich UI application A 251 notifies the panel filter section 24 of the input result of the character string (i.e., the input character string) (step S602). The panel filter section 24 transmits the input result of the character string to the terminal communication section 1232 (step S603). Here, in FIG. 14, the controller communication section 22 is omitted for convenience sake.

Next, the terminal communication section 1232 notifies the panel control section 1231 of the input result of the character string (step S604). In response to the notification of the input result of the character string, the panel control section 1231 sends a request for the non-display of the soft keyboard to the control service 122 (step S605). As a result, the soft keyboard virtually generated is discarded. Next, the panel control section 1231 notifies the legacy application A 1241 of the input result of the character string as the confirmed result of the input via the soft keyboard (step S606). Namely, the panel control section 1231 makes the legacy application A 1241 believe as if the character string is input via the soft keyboard on the operation panel. The legacy application A 1241 stores the notified character string as, for example, an attribute value.

Next, an example procedure is described which is executed when the rich UI application A 251 requires a file resource stored in the image forming apparatus 10 (data stored in a file). For example, in a conventional operation panel, a list of file names is displayed on the operation screen. On the other hand, on the touch panel 204, when it is desired to display a list of thumbnail images thereof, the rich UI application A 251 requires the corresponding file resource.

Figure 15:
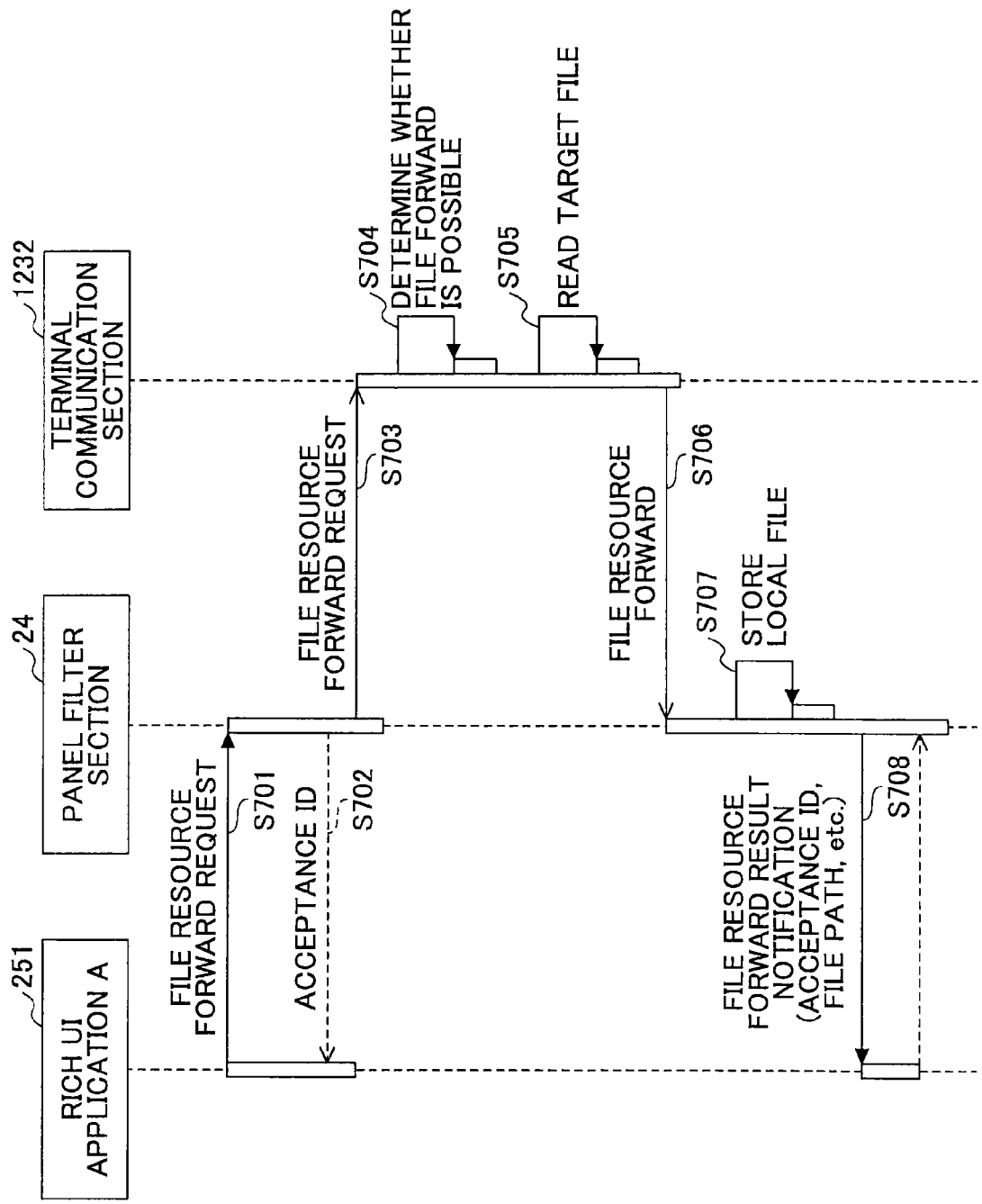
FIG. 15 is a sequence diagram of an example procedure of a process executed when a rich UI application requires a file resource stored in an image forming apparatus.

FIG. 15 is a sequence diagram of an example procedure which is executed when the rich UI application A 251 requires a file resource stored in the image forming apparatus 10.

In step S701, the rich UI application A 251 designates a file path name of a desired file resource and sends a request to the panel filter section 24 to forward the file resource. The panel filter section 24 generates the identification information in response to the request (hereinafter referred to as an "acceptance ID"), and transmits the acceptance ID to the rich UI application A 251. The acceptance ID is sent to the rich UI application A 251, so that the rich UI application A 251 can determine which of the requests corresponds to the response in step S708. This is because the response (in step S708 described below) to a request for sending a file resource (step S701) is asynchronous.

Next, the panel filter section 24 designates the file path name and sends a forward request to the terminal communication section 1232 to forward the file resource (step S703). Further, in FIG. 15, the controller communication section 22 is omitted for convenience sake.

Next, the terminal communication section 1232 determines whether it is possible to forward (transmit) the file resource related to the file path name designated in the forward request (step S704). For example, whether the file related to the file path name exists is determined. When determining that it is possible to forward the file resource, the terminal communication section 1232 reads the file resource from the file related to the file path name designated in the forward request (step S705). Then, the terminal communication section 1232 forwards the file resource to the panel filter section 24 (step S706). When two or more file resources are forwarded, for example, the file path names corresponding to the file resources may also be forwarded.

Upon receipt of the file resource, the panel filter section 24 generates a file in the auxiliary storage device 203 of the information processing terminal 20, and stores the file resource into the file (step S707). Next, the panel filter section 24 notifies the rich UI application A 251 of a file resource forward result which includes, for example, the acceptance ID and the file path name of the file where the file resource is stored (step S708).

The rich UI application A 251 determines which of the requests corresponds to the file resource forward result based on the acceptance ID. After that, the rich UI application A 251 accesses the file which is related to the notified file path name.

In the meantime, the logging into and logging out of the image forming apparatus 10 by a user is not done by the way of the information processing terminal 20. For example, in case of the card authentication using an IC card, a user login is done by setting the user's IC card to the card reader which is connected to the image forming apparatus 10. Such setting of the IC card to the card reader can be detected by the control service 122 of the image forming apparatus 10. It is not desired for the information processing terminal 20 to be involved in the authentication process for the login based on the IC card. Therefore, the authentication process is done by the control service 122. Further, besides the releasing of the setting state of the IC card to the card reader or the information processing terminal 20, the user login may be done by, for example, pressing a hard key which is provided on the image forming apparatus 10. Such an event may also be detected by the control service 122 of the image forming apparatus 10. In the same manner, the logout process in response to the event can also be done by the control service 122.

On the other hand, there may be a case where it is desired for the rich UI application 25 to change its behavior in response to the change of the authentication state of the image forming apparatus 10. Here, the term "change its behavior" refers to the change of, for example, the processing content such as elements included in the display or the screen, and the display manner. Further, the term "the change of the authentication state of the image forming apparatus" refers to an event which is generated (occurred) in response to the user's logging into and logging out of the image forming apparatus 10 and the setting change of the authentication.

Next, a process of notifying the authentication state of the image forming apparatus 10 to the rich UI application 25 is described. In the following, it is assumed that the rich UI application A 251 is the rich UI application 25 that is desired to change its behavior in response to the authentication state of the image forming apparatus 10. In this case, it may be required for the rich UI application A 251 to execute the process of FIG. 16.

Figure 16:
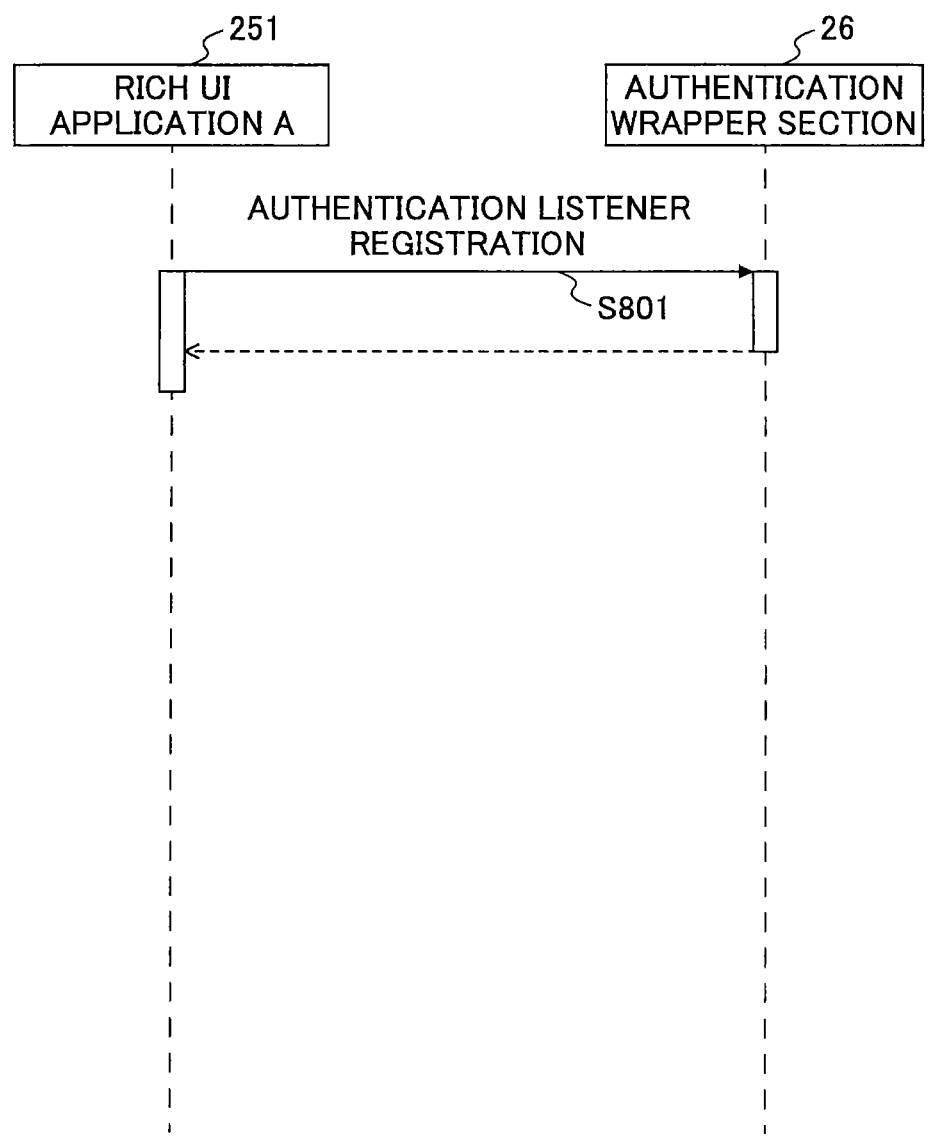
FIG. 16 is a sequence diagram of an example procedure of a registration process of an authentication listener.

FIG. 16 is a sequence diagram of an example procedure of the registration process of an authentication listener.

In step S801, the rich UI application A 251 designates an authentication listener and a registration request to the authentication wrapper section 26 to register the authentication listener. In the registration request, for example, the product ID of the legacy application A 1241 corresponding to the rich UI application A 251 is designated. The term "authentication listener" herein refers to the information indicating the notification destination when the authentication state of the image forming apparatus 10 is changed. In this regard, the authentication listener may be, for example, the address of the object or the address of the function which becomes the notification destination. The authentication wrapper section 26 stores the authentication listener, which is requested to be registered by the rich UI application A 251, in association with the product ID designated in the registration request into, for example, the memory 202. Here, the reason why the product ID is associated with the authentication listener is that there is a possibility where the authentication states differ depending on the SDK applications 124. Specifically, it is supposed to be possible for the image forming apparatus 10 to separately set whether authentication is required for each SDK application 124. When the setting, in which the setting whether the authentication is required for each SDK application 124, is done to the image forming apparatus 10, there may be a case where a user logs in a certain SDK application 124 but does not log into another SDK application 124. Namely, the authentication state may vary depending on the SDK applications 124. In the following, the authentication separately done on the SDK application 124 basis is called "application based authentication".

By executing the process of FIG. 16, it becomes ready for the rich UI application A 251 to receive the notification of the change of the authentication state. Here, the process of step S801 may be executed at any timing of the rich UI application A 251. For example, the process of step S801 may be executed right after the start-up of the rich UI application A 251, or may be executed after a predetermined process is executed.

Next, FIG. 17 is a sequence diagram of an example procedure to notify the change of the authentication state of the image forming apparatus 10 to the rich UI application A 251.

Upon the detection of the change of the authentication state of the image forming apparatus 10, the control service 122 notifies the authentication management section 1233 of the change of the authentication state (step S811). The information notified here (hereinafter "notification information") has an example configuration as shown in FIG. 18.

FIG. 18 is a table illustrating an example configuration of the notification information related to the change of the authentication state. FIG. 18 illustrates the items included in the notification information and the corresponding example values for each of the types of the notification information.

Here, the "login notification" refers to the notification information which is notified when the login is done to the image forming apparatus 10 or a specific SDK application 124. The login notification includes the items of, for example, the product ID, the user name, the user ID, a login result, a type of authentication, a type of a billing apparatus (which is being set). When the login destination is a specific SDK applications 124, the "product ID" is the product ID of the SDK application 124. When the login notification is related to the login to the image forming apparatus 10, the login notification separately generated for each SDK application 124 which is installed or being started up in the image forming apparatus 10, and the generated login notification is notified to the authentication management section 1233. The "user name" refers to the user name of the login user. The "user ID" is the identification information to identify the login user. The "login result" refers to the information indicating whether the login is successful. The "type of authentication" refers to a type of the authentication which is executed during the login process. As the type of authentication, there are, for example, a manager authentication, a personal authentication, the application based authentication, and a service person authentication. The "manager authentication" refers to the authentication which is executed when a user logs in as a manager. The "manager" herein refers to a user who has a special authority. For example, the manager may be authorized to execute a special operation which is not permitted for a general user. The "service person authentication" refers to the authentication when a user logs in as a service person. The "service person" is a person who is in charge of maintaining operation for the image forming apparatus 10 and is entitled to execute an operation dedicated the maintenance operation. The "type of a billing apparatus (which is being set)" refers to an apparatus which is set as an apparatus to be used for billing.

The "logout notification" in FIG. 18 refers to the notification information which is notified when a logout is done from the image forming apparatus 10 or a specific SDK application 124. The logout notification includes the items of the product ID, the type of authentication, the type of a billing apparatus (which is being set), a logout result, etc. When the logout target is a specific SDK application 124, the "product ID" herein refers to the product ID of the SDK application 124. In the case of the logout notification which is related to the logout from the image forming apparatus 10, for example, the logout notification is separately generated for each SDK application 124 which is installed or being started up in the image forming apparatus 10, and the generated login notification is notified to the authentication management section 1233. The logout result is the information indication whether the logout is successful.

The "authentication setting change notification" in FIG. 18 refers to the notification information which is notified when a setting related to the authentication of the image forming apparatus 10 is changed. The authentication setting change notification includes a target item, the type of a billing apparatus (which is being set), etc. The target item refers to a name of the setting item which is the target of the setting change.

The "authentication setting release notification" in FIG. 18 refers to the notification information which is notified when a setting among the settings related to the authentication of the image forming apparatus 10 is released. The authentication setting release notification includes a target item etc. The target item refers to a name of the setting item whose setting is released.

Next, the authentication management section 1233 transmits the notification information indicating the change of the authentication state to the controller communication section 22 via the terminal communication section 1232 (step S812). Then, the controller communication section 22 notifies the authentication wrapper section 26 of the notification information indicating the change of the authentication state (step S813). The authentication wrapper section 26 notifies the rich UI application A 251 of the notification information via the registered authentication listener (step S814). As a result, the rich UI application A 251 can change, for example, the processing content and the screen display content. In a case where the notification information is either the login notification or the logout notification, the notification information is notified to the rich UI application 25 related to the authentication listener corresponding to the product ID of the login notification.

Here, the authentication wrapper section 26 may store the notification information in the memory 202 or the like, and, in response to the process in step S801 of FIG. 16, notify the registration request source of the notification information corresponding to the registration request source of the authentication listener among the storing notification information. By doing this, it becomes possible for the rich UI application 25 of the registration request source to promptly recognize the authentication state of the current image forming apparatus 10 in response to the registration of the authentication listener. The notification information corresponding to the registration request source of the authentication listener refers to, for example, the notification information including the product ID corresponding to the product ID related to the authentication listener in a case of the login notification or the logout notification.

Further, the authentication management section 1233 notifies the legacy application A 1241 also of the notification information (step S815). As a result, it becomes possible to match (share) the recognition of the authentication state of the image forming apparatus 10 between the SDK application 124 and the rich UI application 25 which are related to each other.

After that, when it is no longer desired for the rich UI application A 251 to recognize the authentication state of the image forming apparatus 10, the process of FIG. 19 is executed.

FIG. 19 is a sequence diagram of an example procedure of the registration release process of the authentication listener.

In step S821, the rich UI application A 251 designates the authentication listener registered in step S801, and sends a registration release request to the authentication wrapper section 26 to release the registration of the authentication listener. The authentication wrapper section 26 releases the registration of the authentication listener corresponding to the designated authentication listener among the registered authentication listeners. For example, the authentication listener is deleted from the memory 202. As a result, the authentication listener is removed from the notification destination in step S814. Namely, the rich UI application A 251 is removed from the notification destination of the change of the authentication state of the image forming apparatus 10.

Further, the process of FIG. 19 may be executed when, for example, the execution of the rich UI application A 251 is finished or at any timing of the execution of the rich UI application A 251.

As described above, according to an embodiment, it may become possible to improve the display performance and operability of the operation section. Further, the influence caused by replacing the operation section by the information processing terminal 10 is found in the SDK platform 123, the control service 122, etc. Therefore, it becomes possible to reduce the necessity of the modification of the logic part of the SDK application 124.

Further, according to an embodiment, it becomes possible to change the behavior of the information processing terminal 20 in accordance with the authentication state of the user in the image forming apparatus 10. Therefore, it becomes possible to reduce the degradation of the convenience or operability which is likely to be caused when the operation section is realized by an apparatus which is dependent of the image forming apparatus 10.

Further, in this embodiment, the legacy application A 1241 is an example of a first processing unit, and the SDK platform 123 is an example of a first communication unit. The rich UI application A 251 is an example of a second processing unit. The controller communication section 22 and the panel filter section 24 are an example of a second communication unit. The control service 122 is an example of a detection unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

Reference is made to Japanese Laid-open Patent Publication No. 2009-223577.

According to an embodiment, there is provided an information processing terminal which is functioned as an operation unit of a device (an apparatus). Further, the device includes a first processing unit sending a display request for displaying a configuration element of a screen, a detection unit detecting a change of an authentication state of a user for the device, a first communication unit receiving the display request, designating identification information identifying the configuration element, and transmitting the display request for displaying the configuration element to the information processing terminal or transmitting notification information indicating the change of the authentication state to the information processing terminal. Further, the information processing terminal includes a second communication unit receiving the display request or the notification information, and a second processing unit displaying the configuration element, which is related to the identification information designated in the display request received by the second processing unit, in a form that is different from a form designated in the display request received by the first communication unit, or changing a display manner of the configuration element in accordance with the notification information.

According to an embodiment, there is provided a display control method in an information processing apparatus which is functioned as an operation unit of a device (an apparatus). Further, the device includes a first processing unit sending a display request for displaying a configuration element of a screen; a detection unit detecting a change of an authentication state of a user for the device; and a first communication unit receiving the display request, designating identification information identifying the configuration element, and transmitting the display request for displaying the configuration element to the operation unit or transmitting notification information indicating the change of the authentication state to the operation unit. Further, the method includes receiving, by the information processing terminal, the display request or the notification information, and displaying, by the information processing terminal, the configuration element, which is related to the identification information designated in the display request received by the second processing unit, in a form that is different from a form designated in the display request received by the first communication unit, or changing, by the information processing terminal, a display manner of the configuration element in accordance with the notification information.

According to an embodiment, there is provided a recording medium storing a computer-readable program to cause a device (an apparatus) including an operation unit to execute a display control method. The method includes sending, by the device, a display request for displaying a configuration element of a screen; detecting, by the device, a change of an authentication state of a user for the device; receiving, by the device, the display request, designating, by the device, identification information identifying the configuration element, and transmitting, by the device, the display request for displaying the configuration element to the operation unit or transmitting, by the device, notification information indicating the change of the authentication state to the operation unit. Further, the operation unit includes a second communication unit receiving the display request or the notification information, and a second processing unit displaying the configuration element, which is related to the identification information designated in the display request received by the second processing unit, in a form that is different from a form designated in the display request received by the first communication unit, or changing a display manner of the configuration element in accordance with the notification information.

According to an embodiment, there is provided a recording medium storing a computer-readable program to cause an information processing terminal which is functioned as an operation unit of a device (an apparatus) to execute a display control method. Further, the device includes a first processing unit sending a display request for displaying a configuration element of a screen; a detection unit detecting a change of an authentication state of a user for the device; and a first communication unit receiving the display request, designating identification information identifying the configuration element, and transmitting the display request for displaying the configuration element to the operation unit or transmitting notification information indicating the change of the authentication state to the operation unit. Further, the method includes receiving, by the information processing terminal, the display request or the notification information, and displaying, by the information processing terminal, the configuration element, which is related to the identification information designated in the display request received by the second processing unit, in a form that is different from a form designated in the display request received by the first communication unit, or changing, by the information processing terminal, a display manner of the configuration element in accordance with the notification information.

What is claimed is:

1. A system including a device in communication with an information processing terminal via a network, the device being physically separated from the information processing terminal, the system comprising:
   circuitry configured to:
      detect a change of an authentication state of a user of the device;
      designate identification information identifying a configuration element;
      detect a display request for displaying the configuration element or detect notification information indicating the change of the authentication state;
      generate a first screen on a first display, included in the device, to display the configuration element;
      display the configuration element, which is related to the identification information designated in the display request, on a second screen of a second display, included in the information processing terminal, in a form that is different from a form designated in the display request, or change a display manner of the configuration element displayed on the second screen of the second display in accordance with the notification information; and
      generate the second screen on the second display to display the configuration element in the changed display manner or in the form that is different from the form designated in the display request.

2. The system according to claim 1,
   wherein the circuitry is configured to transmit, in accordance with an operation corresponding to the displayed configuration element, operation information, which includes the identification information identifying the configuration element and a content of the operation, and
   wherein the circuitry is configured to execute a process in accordance with the operation information.

3. The system according to claim 2,
   wherein the circuitry is configured to, in accordance with the operation information, send a change request, which is for changing a display state of the configuration element related to the identification information included in the operation information, and
   wherein the circuitry is configured to change the display state of the configuration element related to the identification information which is a target of the change request for changing the display state.

4. The system according to claim 1,
   wherein the configuration element is a display part on which the circuitry causes the device to execute a process.

5. The system according to claim 1, wherein the circuitry is configured to generate the first screen on the first display to display a plurality of types of configuration elements, wherein each configuration element of the plurality of types of configuration element is designated unique identification information.

6. The system according to claim 1, wherein the circuitry is configured to generate the first screen on the first display to display a plurality of configuration elements of a same type, wherein each configuration element of the plurality of configuration elements of the same type is designated unique identification information.

7. An information processing system comprising:
   a device; and
   an information processing terminal, which is physically separated from the device and is in communication with the device via a network,
   wherein the device includes circuitry configured to:
      send a display request for displaying a configuration element on a screen,
      detect a change of an authentication state of a user of the device,
      designate identification information identifying the configuration element,
      transmit the display request for displaying the configuration element to the information processing terminal or transmit notification information indicating the change of the authentication state to the information processing terminal, and
      generate a first screen on a first display, included in the device, to display the configuration element, and
   wherein the information processing terminal includes other circuitry configured to:
      receive the display request or the notification information,
      display the configuration element, which is related to the identification information designated in the received display request, on a second screen of a second display, included in the information processing terminal, in a form that is different from a form designated in the received display request, or change a display manner of the configuration element displayed on the second screen of the second display in accordance with the notification information, and generate the second screen on the second display to display the configuration element in the changed display manner or in the form that is different from the form designated in the display request.

8. The information processing system according to claim 7, wherein the other circuitry is configured to transmit, in accordance with an operation corresponding to the displayed configuration element, operation information, which includes the identification information identifying the configuration element and a content of the operation, to the device, and wherein the circuitry is configured to execute a process in accordance with the operation information.

9. The information processing system according to claim 8, wherein the circuitry is configured to, in accordance with the operation information, send a change request, which is for changing a display state of the configuration element related to the identification information included in the operation information, to the information processing terminal, and wherein the other circuitry is configured to change the display state of the configuration element related to the identification information which is a target of the change request for changing the display state.

10. The information processing system according to claim 7, wherein the configuration element is a display part on which the circuitry causes the device to execute a process.

11. A display control method in a system including a device in communication with an information processing terminal via a network, the device being physically separated from the information processing terminal, the method comprising:

detecting, by circuitry, a change of an authentication state of a user of the device;

designating, by the circuitry, identification information identifying a configuration element;

detecting, by the circuitry, a display request for displaying the configuration element or detecting, by the circuitry, notification information indicating the change of the authentication state;

generating, by the circuitry, a first screen on a first display, included in the device, to display the configuration element;

displaying, by the circuitry, the configuration element, which is related to the identification information designated in the display request, on a second screen of a second display, included in the information processing terminal, in a form that is different from a form designated in the display request, or changing, by the circuitry, a display manner of the configuration element displayed on the second screen of the second display in accordance with the notification information; and generating, by the circuitry, the second screen on the second display to display the configuration element in the changed display manner or in the form that is different from the form designated in the display request.

12. The display control method according to claim 11, further comprising:

transmitting, in accordance with an operation corresponding to the displayed configuration element, operation information, which includes the identification information identifying the configuration element and a content of the operation; and executing a process in accordance with the operation information.

13. The display control method according to claim 12, further comprising:

in accordance with the operation information, sending a change request, which is for changing a display state of the configuration element related to the identification information included in the operation information; and changing the display state of the configuration element related to the identification information which is a target of the change request for changing the display state.

14. The display control method according to claim 11, wherein the configuration element is a display part on which the circuitry causes the device to execute a process.

* * * * *